(12) United States Patent
Mendlovic et al.

(10) Patent No.: US 7,003,177 B1
(45) Date of Patent: Feb. 21, 2006

(54) METHOD AND SYSTEM FOR SUPER RESOLUTION

(75) Inventors: David Mendlovic, Petach Tikva (IL); Zeev Zalevsky, Rosh Haayin (IL)

(73) Assignee: Ramot at Tel-Aviv University Ltd., Tel Aviv (IL)

(*) Notice: Subject to any disclaimer, the term of this patent is extended or adjusted under 35 U.S.C. 154(b) by 0 days.

(21) Appl. No.: 09/937,580

(22) PCT Filed: Mar. 30, 2000

(86) PCT No.: PCT/IL00/00201

§ 371 (c)(1),
(2), (4) Date: Jan. 4, 2002

(87) PCT Pub. No.: WO00/59206

PCT Pub. Date: Oct. 5, 2000

(30) Foreign Application Priority Data

Mar. 30, 1999 (IL) ...................................... 129258
Nov. 30, 1999 (IL) ...................................... 133243

(51) Int. Cl.
*G06K 9/32* (2006.01)

(52) U.S. Cl. .................................................... 382/299

(58) Field of Classification Search ................ 382/260, 382/274, 275, 282, 284, 294, 299, 255, 280, 382/283; 358/1.2, 3.26, 3.27, 463; 235/462.01, 235/462.02, 462.05, 462.11; 356/3.14
See application file for complete search history.

(56) References Cited

U.S. PATENT DOCUMENTS

| | | | |
|---|---|---|---|
| 4,511,929 A * | 4/1985 | Maeda et al. ................ 358/296 |
| 4,716,414 A | 12/1987 | Luttrell et al. .............. 342/179 |
| 4,748,316 A | 5/1988 | Dickson ...................... 235/454 |
| 4,820,911 A | 4/1989 | Arackellian et al. ......... 235/467 |
| 4,978,860 A | 12/1990 | Bayley et al. ............... 250/568 |
| 5,218,457 A * | 6/1993 | Burkhardt et al. ........... 358/448 |
| 5,315,095 A | 5/1994 | Marom et al. .............. 235/462 |
| 5,315,411 A | 5/1994 | Blanding ..................... 358/482 |
| 5,572,037 A * | 11/1996 | Liu et al. ................... 250/483.1 |
| 5,638,211 A | 6/1997 | Shiraishi ..................... 359/559 |
| 5,657,147 A | 8/1997 | Yoshikawa et al. ......... 359/208 |
| 5,680,253 A | 10/1997 | Hasegawa et al. .......... 359/566 |
| 5,684,620 A | 11/1997 | Schoon ....................... 359/298 |
| 5,909,521 A * | 6/1999 | Nakao et al. ............... 382/312 |
| 6,073,851 A * | 6/2000 | Olmstead et al. ....... 235/462.45 |
| 6,310,967 B1 * | 10/2001 | Heine et al. ................ 382/128 |
| 6,675,140 B1 * | 1/2004 | Irino et al. .................. 704/203 |

FOREIGN PATENT DOCUMENTS

EP         0 777 147         6/1997

OTHER PUBLICATIONS

H. Dammann et al., "High Efficiency In-Line Multiple Imaging By Means of Multiple Phase Holograms", *Opt. Commun.* 3(5), Jul. 1971, pp. 312-315.

(Continued)

*Primary Examiner*—Daniel Miriam
(74) *Attorney, Agent, or Firm*—Ladas and Parry LLP

(57) ABSTRACT

A method and system for enhancing the resolution of an image sensing device, including the steps of attaching a mask to a panel of detectors in an image sensing device, generating multiple fields of view, related to one another by sub-pixel shifts, acquiring multiple images with the image sensing device from the multiple fields of view, and combining the multiple images into an enhanced image of higher pixel resolution than the pixel resolutions of the multiple images.

65 Claims, 13 Drawing Sheets

OTHER PUBLICATIONS

D. Mendlovic et al., "Shift and Scale Invariant Pattern Recognition using Mellin Radial Harmonics", *Opt. Commun.* 67(3), Jul. 1988, pp. 172-176.

D. Mendlovic et al., "Optical-Coordinate Transformation Methods and Optical-Interconnection Architectures", *Appl. Opt.* 32(26), Sep. 1993, pp. 5119-5124.

W. Lukosz, "Optical Systems with Resolving Powers Exceeding the Classical Limit", *JOSA* 56(11), Nov. 1966, pp. 1463-1472.

A. I. Kartashev, "Optical Systems with Enhanced Resolving Power", *Opt. Spectry.* 9, 1960, pp. 204-206.

H. Bartelt and A. W. Lohmann, "Optical Processing of One-Dimensional Signals", *Opt. Commun.* 42(2), Jun. 1982, pp. 87-91.

W. Gartner and A. Lohmann, "An Experiment Going Beyond Abbe's Limit of Diffraction", *Z. Physik* 174, 1963, pp. 18-23.

D. Mendlovic, A. W. Lohmann, N. Konforti, I. Kiryuschev and Z. Zalevsky, "One-Dimensional Superresolution Optical System for Temporally Restricted Objects", *Appl. Opt.* 36 (11), Apr. 1997, pp. 2353-2359.

D. Mendlovic and A. W. Lohmann, "Space-Bandwidth Product Adaptation and its Application to Superresolution: Fundamentals", *JOSA* 14(3), Mar. 1997, pp. 558-562.

D. Mendlovic and A. W. Lohmannn, and Z. Zalevksy, "Space-Bandwidth Product Adaptation and its Application to Superresolution: Examples", *JOSA* 14(3), Mar. 1997, pp. 563-567.

I. Cheeseman, B. Kanefsky, R. Kraft, J. Stutz, and R. Hanson, "Super Resolved Surface Reconstruction from Multiple Images", *Maximum Entropy and Bayesian Methods*, G. R. Heidbreder (ed.), Kluwer, The Netherlands, 1996, pp. 293-308.

A. Zomet and S. Peleg, "Applying Super-Resolution to Panoramic Mosaics", *IEEE Workshop on Applications of Computer Vision*, Princeton, N.J., Oct. 1998.

T. J. Pearson and A. C. S. Readhead, "Image Formation by Self-Calibration in Radio Astronomy", Ann. Rev. *Astron. Astrophys.* 22, 1984, pp. 97-130.

Z. Zalevsky, D. Mendlovic and A. W. Lohmann, "Gerchberg-Saxton Algorithm Applied in the Fractional Fourier or the Fresnel Domain", *Optical Letters* 21, 1996, pp. 842-844.

\* cited by examiner

METHOD AND SYSTEM FOR SUPER RESOLUTION

FIELD OF THE INVENTION

The present invention relates to super resolution enhancement of sampled data.

BACKGROUND OF THE INVENTION

Super-resolution refers to the enhancement of resolutions for images of scenery or objects acquired by an image capture device, such as a scanner or a CCD video camera, beyond the resolution inherent in the capture device, and beyond other limitations of the capture device. Super-resolution is used primarily to enhance the quality of captured images, and to increase the information content therein.

Many super-resolution techniques used with imaging sensors are based on micro scanning operations. When using micro-scanning operations, a scene or object being captured is sampled multiple times, each time with a sub pixel shift applied.

Prior art techniques for super-resolution do not achieve exact super resolution, but rather they perform over-sampling. Exact super resolution is limited by the fill factor, i.e., the ratio between the area of the region sensitive to radiation and the pitch. The pitch is the area between centers of adjacent detectors in a sensor panel—equivalently, the pitch is the area between adjacent pixels. For example, if the sensitivity to radiation only extends over half the distance separating detectors, then the fill factor is 0.5*0.5=25%. With a 25% fill factor, exact super-resolution using prior art methods can be obtained up to a factor of two in resolution in each dimension, since the regions of sensitivity to radiation are only half the size of the pitch, and can thus be shifted by half-pixels in each dimension without overlapping. Additional super-resolution, beyond a factor of two, has been achieved by prior art methods at the expense of decreased contrast.

For a fill factor of 80%, which is typical for image sensing devices, the limitation on exact super-resolution is $$\frac{1}{\sqrt{0.8}} \approx 1.12.$$

The experimental barrier is approximately at a factor of 1.5, with some decrease in contrast.

Prior art methods for obtaining super resolution from captured images are based on estimating signal distortion. These methods perform optimal estimation of signal distortion from the captured images, using Bayesian techniques and using criteria such as Maximum Entropy. These methods are advantageous when image acquisition is made over a large distance (such as satellite data acquired from outer space), since atmospheric transmission and turbulence have a major impact on limiting the resolution obtained.

One such method is described in I. Cheeseman, B. Kanefsky, R. Kraft, J. Stutz, R. Hanson, "Super-Resolved Surface Reconstruction from Multiple Images," in Maximum Entropy and Bayesian Methods, G. R. Heidbreder (ed.), Kluwer, the Netherlands, 1996, pgs. 293–308. This method is based on inverse graphics theory, and is used for ground modeling from outer space observations. An initial ground model is formed by letting each pixel "vote" on what the corresponding ground position should be, based upon the extent that the corresponding ground position contributes to that pixel. The initial ground model is then used to project what an image should be (i.e., predict each pixel value). The differences between the predicted pixel values and the observed pixel values are used to update the ground model until it cannot be further improved. This procedure produces an increase in both spatial resolution and gray-scale resolution.

Another such method is described in A. Zomet and S. Peleg, "Applying Super-Resolution to Panoramic Mosaics," IEEE Workshop on Applications of Computer Vision, Princeton, October 1998. This method attains super resolution using an iterative method for mosaicing. Given a video sequence scanning a static scene, a panoramic image can be constructed whose field of view is the entire scene. Each region in the panorama is covered by many overlapping image segments, and this can be exploited to enhance its resolution.

Another such method is described in Pearson, T. I. and Readhead, A. C. S. "Image Formation by Self-Calibration in Radio Astronomy," Ann. Rev. Astron. Astrophys. 22, 1984, pgs. 97–130. This method uses non linear methods, and is based on optimal spectrum estimation.

SUMMARY OF THE INVENTION

The present specification concerns data obtained by sampling a continuous signal, and describes methods and systems for enhancing the resolution of the data. For example, a barcode reader samples a barcode when scanning it, and the present invention can be used to enhance the resolution of the sampled data, thereby providing a better reconstruction of the barcode. For another example, a CCD camera samples an object or scene being viewed, to produce a digital image, and the present invention can be used to enhance the resolution of the digital image, thereby providing a better quality image.

The present invention enhances sampled data by effectively decreasing the sampling period. When used with digital images, the present invention provides sub-pixel accuracy. An original image quantized into pixel area elements can be enhanced using the present invention to a finer granularity quantization with sub-pixel area elements. For example, the enhanced image can have one-eighth pixel granularity.

The present invention overcomes the limitation of prior art methods to achieve exact resolution improvement by more than a factor of 1.5. Using the present invention, any desired resolution improvement may be obtained by attaching an appropriately designed mask to a sensor plane of a capture device.

There is provided in accordance with a preferred embodiment of the present invention a method for enhancing the resolution of an image sensing device, including the steps of attaching a mask to a panel of detectors in an image sensing device, generating multiple fields of view, the multiple fields of view being related to one another by sub-pixel shifts, acquiring multiple images with the image sensing device from the multiple fields of view, and combining the multiple images into an enhanced image of higher pixel resolution than the pixel resolutions of the multiple images.

There is further provided in accordance with a preferred embodiment of the present invention a system for enhancing the resolution of an image sensing device, including an image sensing device comprising a panel of detectors, a mask attached to said panel of detectors, a motion generator generating multiple fields of view, the multiple fields of view being related to one another by sub-pixel shifts, image acquisition circuitry housed within said image sensing device acquiring multiple images from the multiple fields of view, and a combiner combining the multiple images into an enhanced image of higher pixel resolution than the pixel resolutions of the multiple images.

There is still further provided in accordance with a preferred embodiment of the present invention a method for enhancing the resolution of an image sensing device, including the steps of creating replicas of fields of view using an optical element attached to an image sensing device, acquiring multiple images with the sensing device from the replicas of fields of view, and combining the multiple images into an enhanced image of higher pixel resolution than the pixel resolutions of the multiple images.

There is additionally provided in accordance with a preferred embodiment of the present invention a system for enhancing the resolution of an image sensing device, including an image sensing device, an optical element attached to the image sensing device, the optical element being such as to create replicas of fields of view, image acquisition circuitry housed within the image sensing device acquiring multiple images from the replicas of fields of view, and a combiner combining the multiple images into an enhanced image of higher pixel resolution than the pixel resolutions of the multiple images.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

The present invention concerns digital images captured by digital image acquisition devices, such as digital cameras and scanners, and provides a method and system for obtaining super-resolution imagery. Super-resolution refers to the ability to obtain a resolution of a digital image that is greater than that native resolution of the image acquisition device. The present invention uses multiple low resolution captures of a picture to obtain a high resolution digital image. For example, if 64 images of an object are captured by a CCD camera having a spatial resolution of 32×32 pixels, the present invention can be used to integrate the captured data and provide a digital image of the object at a spatial resolution of 256×256 pixels. The present invention makes efficient use of captured image data, in that there is a direct one-to-one relationship between the number of images captured and the ratio of resolution enhancement. That is, if K images are captured then the present invention enhances resolution of the capture device by a factor of K.

Additionally, the present invention applies to acquisition devices, regardless of their dynamic color range. In the example described above, the CCD camera can have as low as 1 bit per pixel color depth, or as high as 8 bits per pixel and higher, and the present invention is applicable.

As used in the present specification in reference to digital images, the terms "low resolution" and "high resolution" are intended to be relative terms, used to indicate an advantage of the present invention in providing digital images of an input object at a higher resolution than those produced by an image acquisition device.

Figure 1:
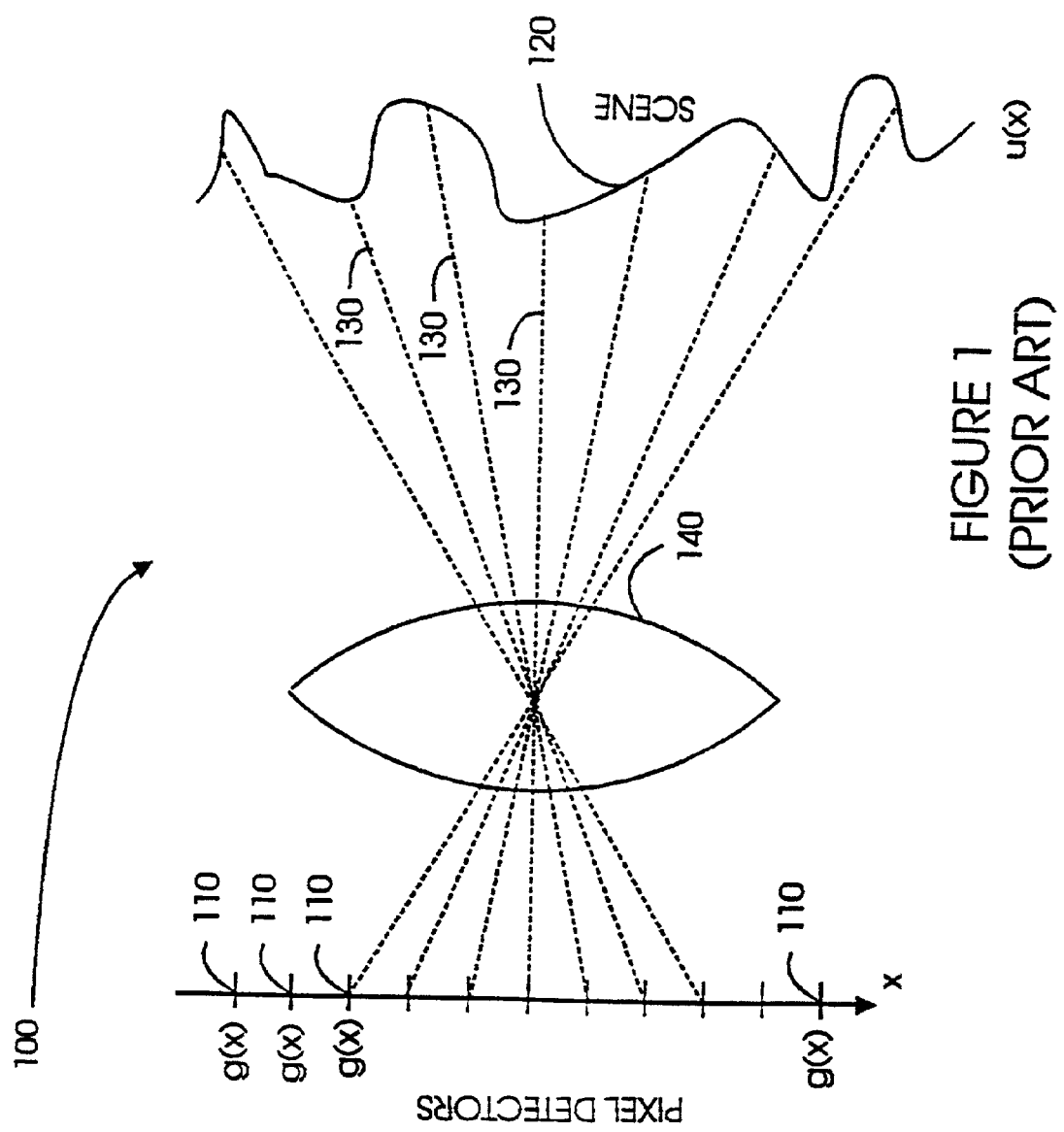
FIG. 1 is an illustration of a one-dimensional cross-section of a prior art image sensing device, such as a CCD camera or a scanner.

Reference is now made to FIG. 1, which illustrates a one-dimensional cross-section of a prior art image sensing device, such as a CCD camera or a scanner. An image sensing device 100 consists of an array of detectors 110 in a sensing panel (not shown), each of which measures a light intensity of a scene 120 at a specific pixel location. Light rays 130 emanating from scene 120 are diffracted by a lens 140, and arrive at detectors 110.

The array of detectors 110 in the sensing panel is two-dimensional, and the one-dimensional array of detectors illustrated in FIG. 1 is but a single cross-section of the two-dimensional array. Similarly, FIG. 1 illustrates a single cross-section of scene 120. The direction of the one-dimensional array of detectors is denoted by a variable x, and the light intensity of the scene is correspondingly denoted by u(x). The variable x is a continuous variable, and scene 120 corresponds to a continuous signal. The array of detectors 110 samples scene 120, and produces a discrete digital image, comprising pixel locations and pixel color intensities. The spacings between detectors corresponds to the pixel size for the sampled digital image, and is referred to as the "pitch."

Figure 2:
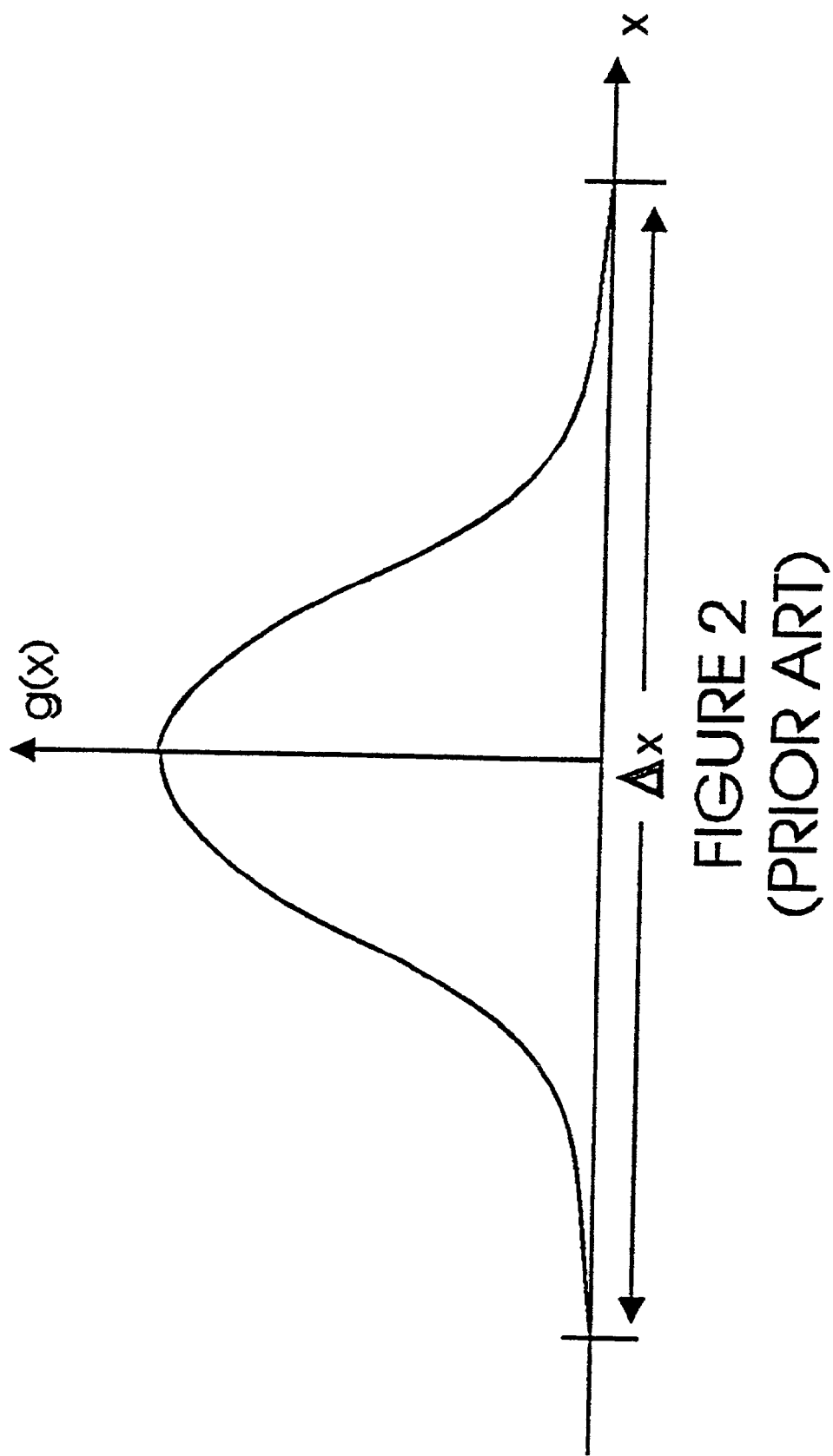
FIG. 2 is a prior art illustration of a pixel sensitivity (apodization) function, for modeling averaged light intensity arriving at a detector.

Reference is now made to FIG. 2, which illustrates a one-dimensional cross-section of a prior art pixel sensitivity (apodization) function, for modeling averaged light intensity arriving at a detector. The measured light intensity at each detector 110 (FIG. 1) is not a measure of the light intensity at a single point location of scene 120. Instead, it is an average intensity, averaged by a pixel sensitivity function $g(x)$, or apodization. The pixel sensitivity function is illustrated as a one-dimensional function $g(x)$ in FIG. 2, but $g(x)$ is only a single cross-section of a two-dimensional pixel sensitivity function $g(x\ y)$.

The support of the two-dimensional pixel sensitivity function corresponds to the region that is sensitive to radiation. This region typically extends across an area that is contained within the area between neighboring pixel centers. The ratio between the area of the two-dimensional support of the pixel sensitivity function and the area between pixel centers containing it is referred to as the "fill factor."

It is the averaging with g(x) that gives rise to complications in obtaining exact super-resolution in prior art methods.

Figure 3A:
FIGS. 3A–3C are illustrations of the results of computer simulations of a preferred embodiment of the present invention, as applied to CCD cameras.
Figure 3B:
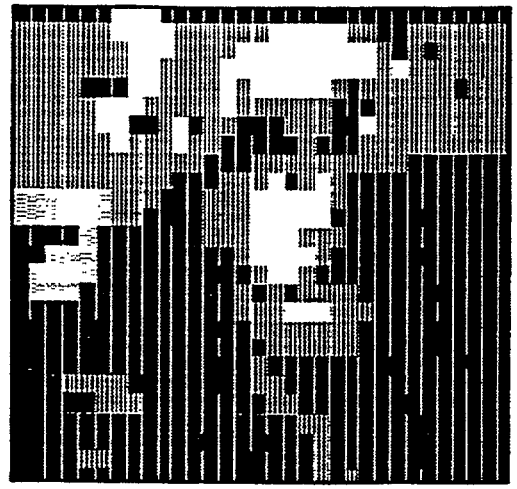
Figure 3C:

Reference is now made to FIGS. 3A–3C, which illustrate the results of computer simulations of a preferred embodiment of the present invention, as applied to CCD cameras. FIG. 3A shows an input picture with spatial resolution of 256×256 pixels. FIG. 3B shows an image of the input picture, captured by a CCD camera having a spatial resolution of 32×32 pixels, and 8 bits per pixel color depth. FIG. 3C shows the reconstructed image obtained by the present invention by using 64 pictures like the one illustrated in FIG. 3B. It can be seen that substantially all of the spatial details contained within the input picture are reconstructed in the image of FIG. 3C.

Figure 4B:
FIGS. 4A–4D are further illustrations of the results of computer simulations of a preferred embodiment of the present invention, as applied to CCD cameras.
Figure 4D:
Figure 4A:
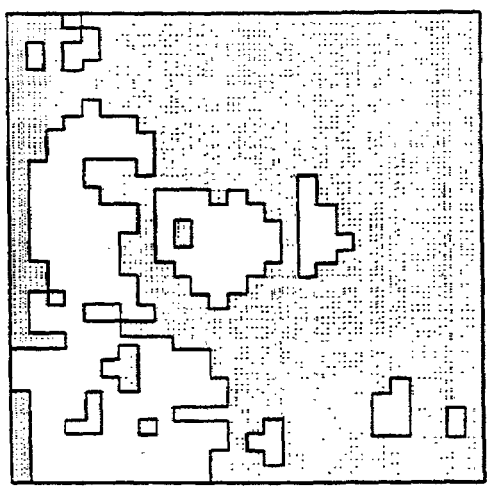

Reference is now made to FIGS. 4A–4D, which further illustrate the results of computer simulations of a preferred embodiment of the present invention, as applied to CCD cameras. FIG. 4A shows a low resolution image captured from the input picture illustrated in FIG. 3A, using a CCD camera having a spatial resolution of 32×32 pixels and a color depth of 1 bit per pixel. It can be seen that the image shown in FIG. 4A is a black and white image. FIG. 4B shows the reconstructed image obtained by the present invention by using 64 pictures like the one illustrated in FIG. 4A. It can be seen that although FIG. 4B is not identical to FIG. 3A, it nevertheless is a much better approximation than is FIG. 4A, both in terms of spatial resolution and in terms of dynamic color range.

Figure 4C:
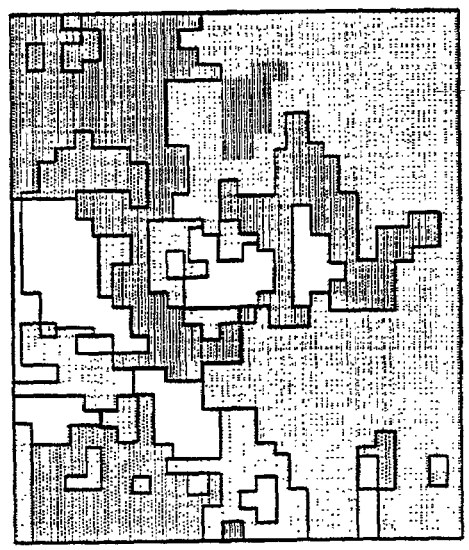

Similarly, FIG. 4C shows a low resolution image captured from the input picture illustrated in FIG. 3A, using a CCD camera having a spatial resolution of 32×32 pixels and a color depth of 2 bits per pixel. It can be seen that the image shown in FIG. 4C is comprised of four colors. FIG. 4D shows the reconstructed image obtained by the present invention, by using 64 pictures like the one illustrated in FIG. 4C. It can be seen that FIG. 4D is almost identical to FIG. 3A.

When the present invention was applied to a CCD camera having a spatial resolution of 32×32 pixels and a color depth of 4 bits per pixel (not shown), the reconstructed image (not shown) was indistinguishable from the original.

Figure 5A:
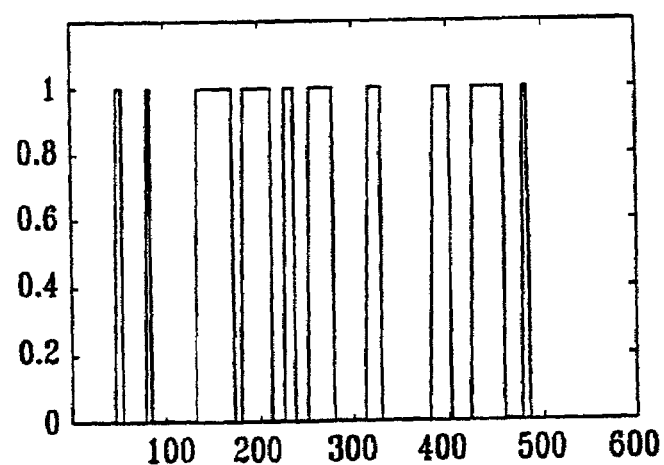
FIGS. 5A–5C are illustrations of the results of computer simulations of a preferred embodiment of the present invention, as applied to barcode readers.
Figure 5B:
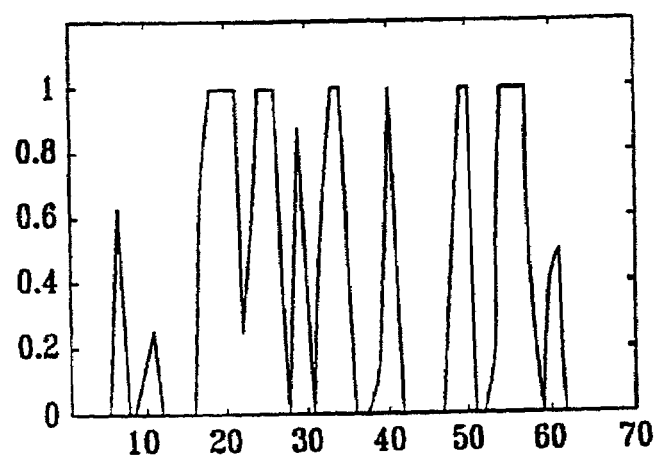
Figure 5C:
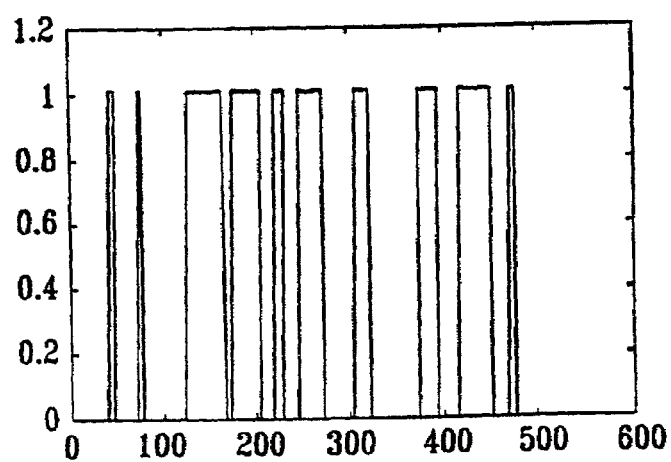

Reference is now made to FIGS. 5A–5C, which illustrates the results of computer simulations of a preferred embodiment of the present invention, as applied to barcode readers. Shown in FIG. 5A is an original barcode. Shown in FIG. 5B is the image captured by a bar code reader. As a result of the limited resolving capability of the barcode reader, the captured image shown in FIG. 5B is substantially different from the barcode shown in FIG. 5A. Shown in FIG. 5C is a reconstructed image of the barcode using the present invention, based on eight vertical replications. A comparison between FIG. 5A and FIG. 5C indicates that the present invention successfully overcomes the limitations of conventional barcode readers in resolving scanned barcodes.

The present specification describes the process for acquiring multiple low resolution images from a single picture, and the way to combine the multiple low resolution image data to generate a high resolution image.

Conventions and Notation

In the ensuing description it is assumed that a sensing device samples an object being acquired in lines, such as horizontal lines, using N pixels per line. The present invention is preferably applied separately in two dimensions, such as in a horizontal dimension and a vertical dimension, to increase the pixel resolutions in each of the dimensions. Since the applications of the present invention in each of the dimensions are similar, for the sake of clarity and definiteness the present specification describes a preferred embodiment of the present invention in a single dimension, such as a horizontal dimension. In particular, rather than use two coordinates (x, y) in the discussion below, a single x coordinate is used, and rather than work with double integrals and double sums, single integrals and since sums are used. Similarly, two-dimensional doubly periodic masking of a two-dimensional array of detectors in a sensing panel is described hereinbelow using a one-dimensional periodic masking function m(x).

When the sensing device samples a line, the detected energy of the n-th pixel is given by $$u[n] = \int_{-\infty}^{\infty} u(x + n\Delta x)g(x)\,dx, \quad (1)$$

$$n = 0, 1, \ldots, N-1,$$

where u(x) denotes the captured object along a specific line, $\Delta x$ denotes the pixel width and g(x) denotes the pixel sensitivity (i.e. apodization).

Multiple Image Acquisition

In a preferred embodiment of the present invention, the sensing device samples a line K times, each time with a shift in the captured object relative to the capture device by an amount of $\Delta x/K$. Letting $u_k[n]$ denote the detected energy of the n-th pixel in the k-th sampling, Equation 1 generalizes to $$u_k[n] = \int_{-\infty}^{\infty} u\left(x + n\Delta x + k\frac{\Delta x}{K}\right)g(x)\,dx, \quad (2)$$

$$n = 0, 1, \ldots, N-1; \quad k = 0, 1, \ldots, K-1.$$

Together, the various samples $u_k[n]$ provide KN samples given by $$y[n] = \int_{-\infty}^{\infty} u\left(x + n\frac{\Delta x}{K}\right)g(x)\,dx, \quad (3)$$

$$n = 0, 1, \ldots, KN-1.$$

In an preferred embodiment of the present invention, the shifts in successive image acquisitions by $\Delta x/K$ are implemented by using vibrations of the sensing device. For example, the sensing device can be placed on a vibrating platform. The parameters of the vibrations are estimated by vibration sensors or by use of appropriate algorithms. The vibration parameters are used to synchronize the sampling of the object so that the sampling occurs at times when the vibrated sensing device is located at appropriate sub-pixel shifts.

In an alternate embodiment of the present invention, an assembly of one or more rotated mirrors can be used to shift successive fields of view of a sensing device by sub-pixel shifts. The rotated mirrors reflect the scene to the sensing device.

In yet another embodiment, the shifts in successive image acquisitions by $\Delta x/K$ can be implemented using an optical element instead of the imaging lens of the sensing device. The optical element is attached to the aperture of the sensing device, and serves like a grating to create replicated views of an object. Typically gratings result in replicas since the Fourier transform of a grating is an impulse train of delta functions. This embodiment using an optical element to create replicated views is particularly well suited for objects that are sufficiently small so that the replicas do not overlap.

The abovementioned optical element can be designed, for example, by a multi-facet lens. It can also be designed by an algorithm such as the one described in Z. Zalevsky, D. Mendlovic and A. W. Lohmann, Gerchberg-Saxton algorithm applied in the fractional Fourier or the Fresnel domain, Optical Letters 21, 1996, pages 842–844, the contents of which are hereby incorporated by reference.

It should be apparent to those skilled in the art that it is not necessary that the multiple acquired images be separated by identical sub-pixel shifts. The present invention applies to multiple acquired images separated by sub-pixel shifts of arbitrary sizes. Moreover, successive shifts between acquired images do not have to be sub-pixel. The shifts can be larger than one pixel shifts, as long as the multiple acquired images are all non-integral pixel shifts from one another. Specifically, the relative shifts of the multiple acquired images with reference to a fixed origin can be set to values $r_0 \Delta x, r_1 \Delta x, \ldots, r_{K-1} \Delta x$, as long as the differences $r_i - r_j$ are non-integral for any distinct indices i and j. The case of equal sub-pixel shifts described above corresponds to $r_k = k/K$.

Figure 6:
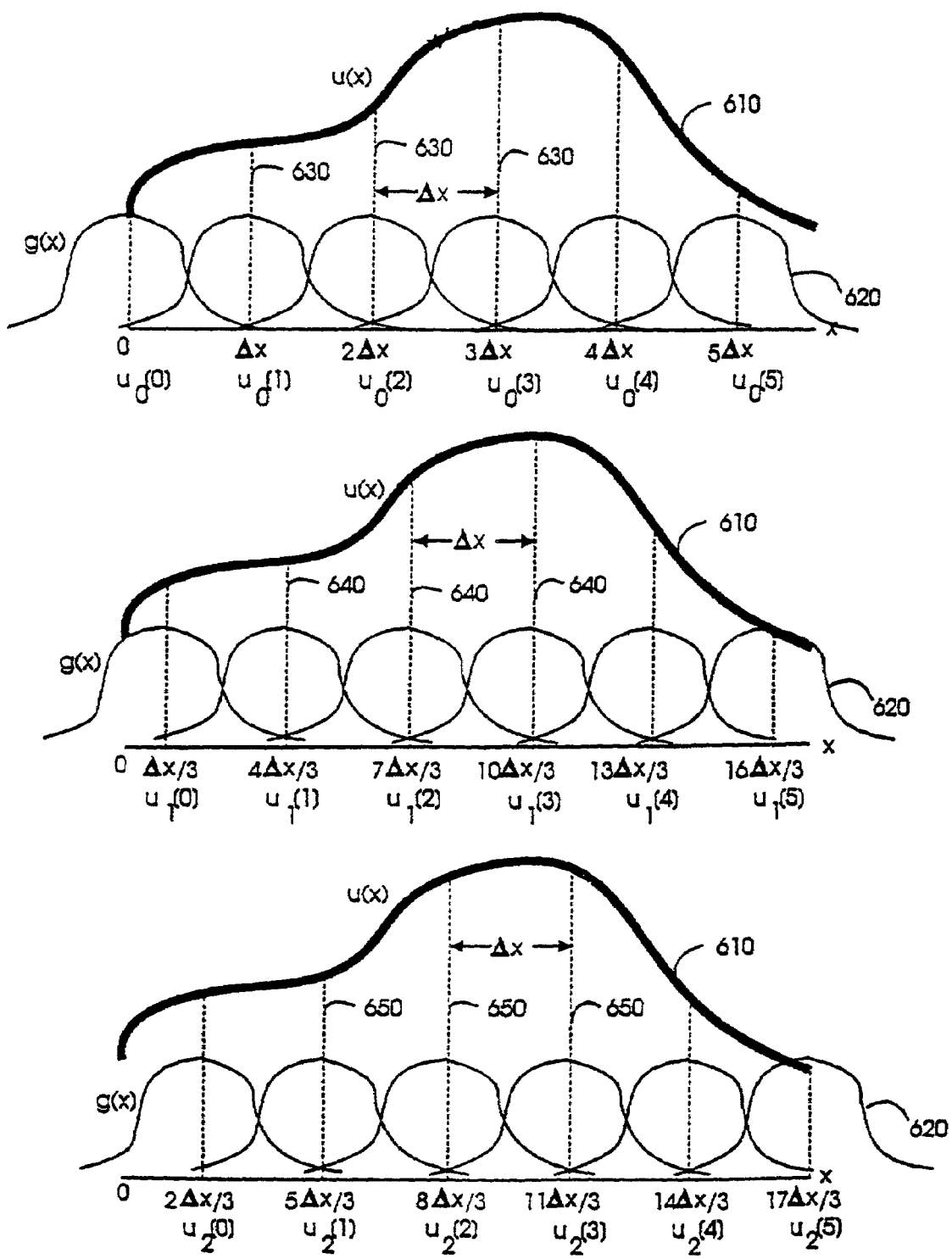
FIG. 6 is an illustration of three samplings of an object by a sensing device, separated by sub-pixel shifts, in accordance with a preferred embodiment of the present invention.

Reference is now made to FIG. 6, which illustrates three samplings of an object by a sensing device, separated by sub-pixel shifts, in accordance with a preferred embodiment of the present invention. The object is indicated by a curve u(x), denoted by reference numeral 610. The curve u(x) denotes the color of the object along a line, as a function of position, x. Also indicated in FIG. 6 is a curve g(x) denoting the sensitivity of a pixel, denoted by reference numeral 620. The curve g(x) is a characteristic of the sensing device, and indicates how color values are localized by averaging.

Each row in FIG. 6 indicates a sampling. The first row samples the object u(x) at positions indicated by dashed vertical lines 630. The six pixel values are denoted by $u_1[0], u_1[1], \ldots u_1[5]$. The second row samples the object u(x) at shifted positions indicated by dashed vertical lines 640. The six pixel values are denoted by $u_1[0], u_1[1], \ldots u_1[5]$. The third row samples the object u(x) at shifted positions indicated by dashed vertical lines 650. The six pixel values are denoted by $u_2[0], u_2[1], \ldots u_2[5]$.

The samplings indicated by the second and third rows is often referred to as "sub-pixel" sampling, since these samplings are centered at fractional pixel locations. Specifically, in FIG. 6, the samples in the second row are centered at the one-third pixel locations, and the samples in the third row are centered at the two-thirds pixel locations. The value of K for the geometry illustrated in FIG. 6 is K=3. The three sets of samples together form the eighteen samples $y[0]=u_0[0], y[1]=u_1[0], y[2]=u_2[0], y[3]=u_0[1], \ldots, y[17]=u_2[5]$, form the full set of samples at all of the pixel thirds locations. These eighteen samples y[n] are used to reconstruct the values u(0), $$u\left(\frac{\Delta x}{3}\right),$$

$$u\left(\frac{2\Delta x}{3}\right), \ldots, u\left(\frac{17\Delta x}{3}\right)$$

of the object u(x).

The present invention uses the samples y[n] to approximately reconstruct the values of $$u\left(n\frac{\Delta x}{K}\right).$$

Determining these reconstructed values achieves super-resolution with a resolution enhancement factor of K, since the sensing device has a resolution of N pixels per line, and the reconstructed signal has KN pixels per line.

In order to describe the reconstruction of the values $$u\left(n\frac{\Delta x}{K}\right)$$

from the samples y[n], a classical result from signal processing is used, which relates the discrete Fourier transform of a sampled analog signal to the continuous Fourier transform of the analog signal.

A Bit of History: Frequency Representation of Sampling

In the ensuing description, s(t) is used to denote a continuous time signal, and $S(j\Omega)$ is used to denote its continuous-time Fourier transform, defined by:

$$S(j\Omega) = \int_{-\infty}^{\infty} s(t)e^{-j\Omega t} dt. \tag{4}$$

Periodic sampling of s(t) with a sampling period of T produces a discrete time signal s[n], defined by:

$$s[n] = s(nT) \tag{5}$$

The discrete-time Fourier transform of s[n] is denoted by $S(e^{j\omega})$, and is defined by:

$$S(e^{j\omega}) = \sum_{n=-\infty}^{\infty} s[n]e^{-j\omega n}. \tag{6}$$

An age-old result, referred to as the Poisson Summation Formula and which is one of the most prominent formulas used in discrete signal processing, provides a relationship between the continuous-time Fourier transform $S(j\Omega)$ of a continuous time signal and the discrete-time Fourier transform $S(e^{j\omega})$ of the sampled signal. Specifically, the Poisson Summation Formula states that $$\sum_{n=-\infty}^{\infty} s(nT) = \frac{1}{T} \sum_{k=-\infty}^{\infty} S\left(-j\frac{2\pi k}{T}\right). \tag{7}$$

In fact, more generally the Poisson Summation Formula establishes that $$\sum_{n=-\infty}^{\infty} s(t+nT) = \frac{1}{T} \sum_{k=-\infty}^{\infty} S\left(-j\frac{2\pi k}{T}\right) e^{-j\frac{2\pi kt}{T}}, \tag{8}$$

of which Equation 7 above is a special case corresponding to t=0.

A simple proof of Equation 8, as indicated on page 210 of Rudin, W., "Real and Complex Analysis: Second Edition," McGraw-Hill, 1974, is as follows. The function f(t) defined by $$f(t) = \sum_{n=-\infty}^{\infty} s(t + nT) \quad (9)$$

is a periodic function with period T. As such, it has a standard Fourier series expansion of the form $$f(t) = \sum_{k=-\infty}^{\infty} c_k e^{-j\frac{2\pi kt}{T}}, \quad (10)$$

where the Fourier coefficient $c_k$ is given by $$c_k = \frac{1}{T} \int_0^T f(t) e^{j\frac{2\pi kt}{T}} dt. \quad (11)$$

Upon substituting Equation 9 into Equation 11 it can be seen that $$c_k = \frac{1}{T} \int_{-\infty}^{\infty} s(t) e^{j\frac{2\pi kt}{T}} dt = \frac{1}{T} S\left(-j\frac{2\pi k}{T}\right), \quad (12)$$

from which Equation 8 follows when Equation 12 is substituted back into Equation 10.

If the function $$s(t) e^{-j\frac{\omega t}{T}}$$

is used in Equation 8, instead of the function s(t), one obtains the result $$\sum_{n=-\infty}^{\infty} s(t + nT) e^{-j\omega n} = \frac{e^{j\frac{\omega t}{T}}}{T} \sum_{k=-\infty}^{\infty} S\left(j\frac{\omega - 2\pi k}{T}\right) e^{-j\frac{2\pi kt}{T}}. \quad (13)$$

By setting t=0 in Equation 13 one arrives at the familiar sampling equation $$S(e^{j\omega}) = \frac{1}{T} \sum_{k=-\infty}^{\infty} S\left(j\frac{\omega - 2\pi k}{T}\right), \quad (14)$$

which appears as Equation 3.20 in A. V. Oppenheim and R. W. Schafer, "Discrete-Time Signal Processing," Prentice Hall, 1989. Equation 14 indicates that the discrete Fourier transform of a sampled analog signal is comprised of periodically repeated copies of the continuous Fourier transform of the analog signal. The copies are shifted by integer multiples of the sampling frequency and superimposed. Equation 14 is often expressed in terms of delta functions; namely, that the Fourier transform of an impulse train $$\sum_{n=-\infty}^{\infty} \delta(t - nT)$$

is itself an impulse train $$\frac{2\pi}{T} \sum_{k=-\infty}^{\infty} \delta\left(\Omega - \frac{2\pi k}{T}\right).$$

It is noted that Equation 14 can also be derived directly from Equation 7 by using $$s(t) e^{-j\frac{\omega t}{T}}$$

instead of s(t).

For values of ω that are small enough to avoid significant aliasing in Equation 14, say $\omega < \Omega_s$, one can approximate the sums on the right hand sides of Equations 13 and 14 by the term with k=0. When this approximation is made, it in turn leads to the approximation $$\sum_{n=-\infty}^{\infty} s(t + nT) e^{-j\omega n} \approx S(e^{j\omega}) e^{j\frac{\omega t}{T}}, \left|\frac{\omega}{T}\right| < \Omega_s. \quad (15)$$

It is noted that as the sampling period, T, decreases, the approximation in Equation 15 becomes more accurate. The increase in accuracy is due to the fact that the aliasing, or overlap, between the copies on the right hand sides of Equations 13 and 14 decreases, since the shifts $$\frac{2\pi}{T}$$

between copies increase.

The present invention uses a version of Equation 15 to obtain super-resolution. Specifically, instead of sampling s[n] s(nt) as in Equation 5, the sampling is done through an integral $$y[n] = \int_{-\infty}^{\infty} s(t + nT) g(t) dt, \quad (16)$$

where g(t) represents the sensitivity, or apodization, of a pixel. Multiplying both sides of Equation 15 by g(t) and integrating, results in $$Y(e^{j\omega}) \approx S(e^{j\omega}) G\left(-j\frac{\omega}{T}\right), \left|\frac{\omega}{T}\right| < \Omega_s. \quad (17)$$

which is the form used in the present invention.

Referring back to Equation 3, it follows from Equation 17, upon replacing T by $$\frac{\Delta x}{K},$$

that $$U(e^{j\omega}) \approx \frac{Y(e^{j\omega})}{G\left(-j\frac{\omega K}{\Delta x}\right)}, \left|\frac{\omega K}{\Delta x}\right| < \Omega_s, \quad (18)$$

where $U(e^{j\omega})$ is the discrete Fourier transform of the samples $$u\left(n\frac{\Delta x}{K}\right),$$

sought to be reconstructed; namely, $$U(e^{j\omega}) = \sum_{n=-\infty}^{\infty} u\left(n\frac{\Delta x}{K}\right)e^{-j\omega n}. \quad (19)$$

The Fourier transform $Y(e^{j\omega})$ is known from the samples y[n] in Equation 3, and the Fourier transform $$G\left(-j\frac{\omega K}{\Delta x}\right)$$

is determined from knowledge of the sensitivity function g(x). It is noted that as K increases, the approximation in Equation 18 becomes more accurate.

Regarding the Fourier transform $Y(e^{j\omega})$, the values of y[n] set forth in Equation 3 above are only defined for indices n=0, 1, . . . , KN-1. For indices n outside of this range, y[n] is preferably defined to be zero. With such a convention, the Fourier transform $Y(e^{j\omega})$ is given by the finite sum $$Y(e^{j\omega}) = \sum_{n=0}^{KN-1} y[n]e^{-j\omega n}. \quad (20)$$

In a preferred embodiment, the present invention uses Equation 18 to determine the Fourier transform $U(e^{j\omega})$, and then reconstructs the values $$u\left(n\frac{\Delta x}{K}\right),$$

n=0, 1, . . . , KN-1 from $U(e^{j\omega})$ by using an inverse discrete Fourier transform. Preferably a Fast Fourier Transform (FFT), as is familiar to those skilled in the art, is used to invert the spectral values $U(e^{j\omega})$. The reconstruction is approximate, since Equation 18 is itself only an approximation. Since it is necessary to reconstruct KN values of u(x), it is accordingly necessary to apply Equation 18 at KN frequencies that are spaced $$\frac{2\pi}{KN}$$

apart one from the next, since the Fourier transform $U(e^{j\omega})$ is periodic with period $2\pi$. In a preferred embodiment of the present invention, Equation 18 is applied at the KN frequencies $$\omega = \frac{2\pi k}{KN}, k = 0, 1, \ldots, KN - 1. \quad (21)$$

When the Fourier transform $U(e^{j\omega})$ is inverted it is possible that values of $$u\left(n\frac{\Delta x}{K}\right)$$

are non-zero outside of the index range n=0, 1, . . . , KN-1. As it is only the values of $$u\left(n\frac{\Delta x}{K}\right)$$

within the index range n=0, 1, . . . , KN-1 that are of interest, the values outside this index range can be ignored.

An apparent difficulty arises in implementing Equation 18 if there are frequencies $\omega$ as given in Equation 21, at which $$G\left(-j\frac{\omega K}{\Delta x}\right) = 0,$$

since this would entail division by zero at such frequencies.

The function $G(-j\Omega)$ is typically a real-valued function, since the pixel sensitivity function g(x) is typically symmetric about x=0. Since a pixel is typically more sensitive to light in its central area and less sensitive in its outer regions, the pixel sensitivity function g(x) is typically "bell-shaped," similar to Gaussian functions. In case g(x) happens to be a Gaussian function, its Fourier transform has no zeros, and there no divisions by zero are encountered in implementing Equation 18. However, for other sensitivity functions, such a difficulty can arise.

The present invention avoids such a difficulty by using specially constructed masks, as described hereinbelow.

Masking

In order to avoid division by zero in Equation 18, the present invention preferably employs an optical device to remove zeros of $$G\left(-j\frac{\omega K}{\Delta x}\right)$$

that are less than the frequency $\Omega_S$. The frequency $\Omega_S$ is the maximal frequency in the reconstructed data.

The present invention preferably attaches a mask in the form of a fine transmission grating with a period of $\Delta x$ to the sensing device panel. As mentioned hereinabove, the mask under discussion is really a two-dimensional doubly periodic mask that covers a two-dimensional array of detectors. For the sake of clarity and definiteness it is being described as a single dimensional periodic mask, with the understanding that the one-dimensional analysis presented herein applies to each of the two dimensions of the sensing device panel.

Figure 7:
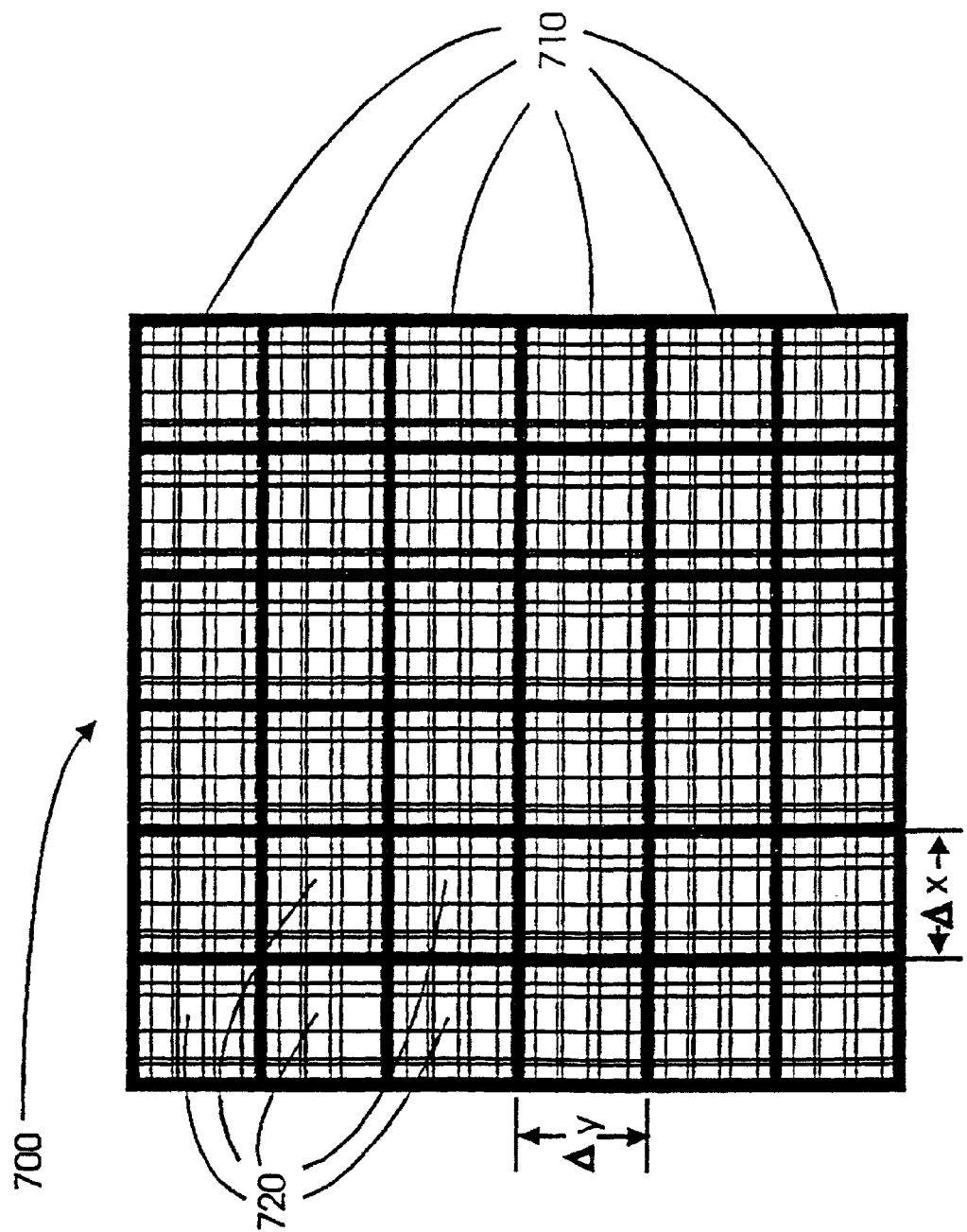
FIG. 7 is a simplified illustration of a mask attached to a sensor panel of array detectors in an image sensing device, in accordance with a preferred embodiment of the present invention.

Reference is now made to FIG. 7, which is a simplified illustration of a mask attached to a sensor panel of array detectors in an image sensing device, in accordance with a preferred embodiment of the present invention. A sensor panel 700 in an image sensing device contains a two-dimensional array of detectors 710. Detectors 710 are depicted as individual cells within sensor panel 700. The array of detectors is periodic, with periodic spacings $\Delta x$ and $\Delta y$ in the horizontal and vertical dimensions, respectively. The spacings $\Delta x$ and $\Delta y$ correspond to the pixel spacings in the sampled digital image obtained from the image sensing device. A masking pattern 720 in the form of a fine sub-pixel transmission grating is used to generate a doubly periodic mask, with respective periods $\Delta x$ and $\Delta y$ in the horizontal and vertical dimensions. In a preferred embodiment of the present invention, the doubly periodic mask is attached to sensor panel 700. Each detector 710 is masked by the same masking pattern 720.

Use of a mask decreases the effective size of each pixel so that the Fourier transform $G(j\Omega)$ of its sensitivity function has a wider band, and its zeros accordingly move to higher frequencies. The apodized pixel, determined by the transmission pattern of the grating, is preferably designed in an iterative manner, as described hereinbelow, so that the bandwidth of the Fourier transform $G(j\Omega)$ of its sensitivity function is wider than the maximal frequency to be reconstructed. Use of a transmission grating has the disadvantage of decreasing the energy sensed at each pixel, since it blocks out some of the illumination.

A mask is described mathematically by a spatial function $m(x)$, preferably taking values 0 and 1. The effect of a mask is to modify the pixel sensitivity function from $g(x)$ to $p(x)=g(x)m(x)$. An objective of choosing a suitable mask is to obtain a function $p(x)$ whose Fourier transform does not have zeroes at frequencies that are between 0 and $\Omega S$, so that when the Fourier transform $$P\left(-j\frac{\omega K}{\Delta x}\right)$$

of the modified pixel sensitivity function $p(x)$ is used in Equation 18 instead of $$G\left(-j\frac{\omega K}{\Delta x}\right),$$

there is no division by zero.

A rationale for using a mask to avoid zeroes of G is that typically an effect of a mask is to add frequencies that may have not been present beforehand.

To construct a mask as desired, the present invention preferably uses a grating in the form of a plurality of optically transparent slits.

$$m(x) = 1 - \sum_{i=1}^{M} rect\left(\frac{x}{\delta x_i}\right) \otimes \delta(x - x_i), \quad (22)$$

where M is the total number of slits, $x_1$, $x_2$, $x_M$ are the locations of the slits and $\delta x_i$ is the width of the i-th slit. The function rect( ) is given by $$rect(z) = \begin{cases} 1, & -1/2 < z < 1/2, \\ 0, & \text{otherwise} \end{cases} \quad (23)$$

and ⓒ denotes convolution.

Figure 8:
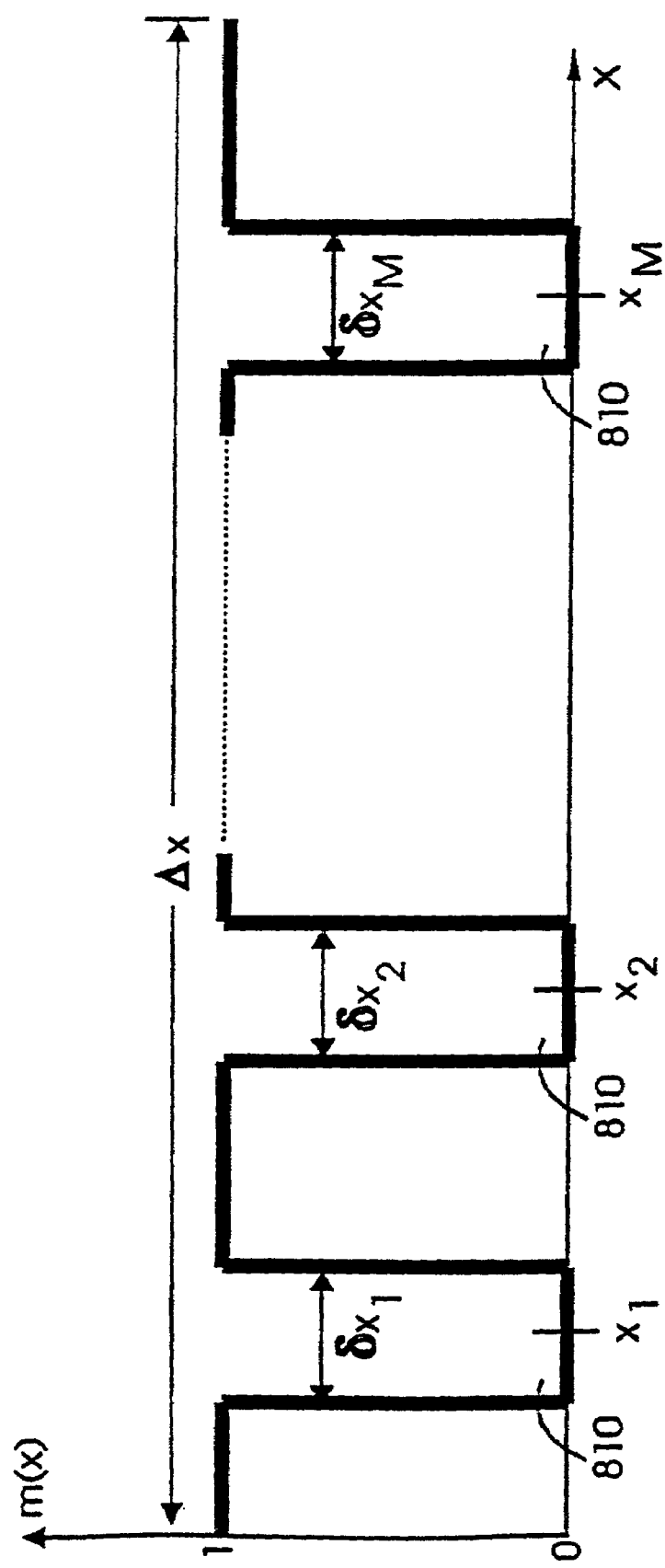
FIG. 8 illustrates the shape of a mask in accordance with a preferred embodiment of the present invention.

Reference is now made to FIG. 8, which illustrates the shape of a mask in accordance with Equation 22. Such a mask consists of M slits 810, centered at positions $x_1$, $x_2$, ..., $x_M$, each having respective widths of $\delta x_i$. Preferably, the value of M is a number between zero and K, and the values $\delta x_i$ are each approximately equal to the sub-pixel size $\Delta x/K$. As can be seen in FIG. 8, the values of the mask $m(x)$ are 0 inside the slits and 1 outside the slits. The total width of the mask if $\Delta x$; namely, the width of a pixel. The mask is intended to affect the shape of $g(x)$ at sub-pixel granularity. In practice, the granularity is discretized to $\Delta x/K$; namely, the sub-pixel shift between successive images acquired by the image sensing device. For example, referring back to FIG. 3C, the mask used in reconstructing the image shown therein is [0 1 0 1 1 0 0 0], each of the eight entries in this array representing a sub-pixel size of one eighth of a pixel. Thus the function $m(x)$ for the mask used in FIG. 3C is given for $0 \leq x < \Delta x$ by $$m(x) = \begin{cases} 1, & \frac{1}{8}\Delta x \leq x < \frac{2}{8}\Delta x, \text{ or } \frac{3}{8}\Delta x \leq x < \frac{5}{8}\Delta x \\ 0, & \text{otherwise.} \end{cases} \quad (24)$$

The sensitivity function of each masked pixel is given by $$p(x)=g(x)m(x), \quad (25)$$

and it can be seen that the Fourier transform of $p(x)$ is given by $$P(j\Omega) = P(j\Omega; x_1, x_2, \ldots, x_M; \delta x_1, \delta x_2, \ldots, \delta x_M) = \quad (26)$$

$$= G(j\Omega) - \sum_{i=1}^{M} \delta x_i G(j\Omega) \otimes \left[e^{-j\Omega x_i} \text{sinc}\left(\frac{1}{2}\Omega \delta x_i\right)\right],$$

where sinc(z) denotes the function $$\text{sinc}(z) = \frac{\sin z}{z}.$$

Preferably, to determine an optimal mask, a predetermined value of M is selected, and a search is made for position values $x_1, x_2, \ldots, x_M$ and widths $\delta x_1, \delta x_2, \ldots, \delta \&_M$ for which the $|P(j\Omega)|$ is bounded away from zero as much as possible. Specifically, define $$\sigma(x_1, x_2, \ldots, x_M; \delta x_1, \delta x_2, \ldots, \delta x_M) = \quad (27)$$

$$\min_{\Omega \leq \Omega_S} |P(j\Omega; x_1, x_2, \ldots, x_M; \delta x_1, \delta x_2, \ldots, \delta x_M)|,$$

where $\Omega_S$ denotes the frequency up to which no significant aliasing occurs, as defined above. Then optimal values for $x_1, x_2, \ldots, x_M$ and $\delta x_1, \delta x_2, \delta x_M$ are preferably determined by $$(x_1, x_2, \ldots, x_M; \delta x_1, \delta x_2, \ldots, \delta x_M) = \qquad (28)$$
$$\text{arg-max } \sigma(x_1, x_2, \ldots, x_M; \delta x_1, \delta x_2, \ldots, \delta x_M),$$

where arg-max denotes the arguments $x_1, x_2, \ldots, x_M$ and $\delta x_1, \delta x_2, \ldots, x_M$ which maximize the function $\sigma$.

The search range over which optimal values of $x_1, x_2, \ldots, x_M$ and $\delta x_1, \delta x_2, \ldots, \delta x_M$ are sought is such that the total $\delta x_1 + \delta x_2 + \ldots + \delta x_M$ of all the widths does not exceed the pixel width $\Delta x$. Additionally, each individual width $\delta x_i$ must not be less than $2\lambda$, where $\lambda$ is the wavelength of the incoming light—otherwise, the light will not be affected by the mask. Moreover, construction of a mask and attaching it to the detectors may further limit the widths $\delta x_i$ to exceed a minimum value of $\delta x_{min}$.

From energy considerations, it is clear that on the one hand, it is desirable that each width $\delta x_i$ be as small as possible, since $\delta x_i$ is proportional to the energy blocked by the mask. On the other hand, this must be traded off against the condition that $|P(j\Omega)|$ be bounded away from zero.

Specifically, if $E_t$ denotes the total light energy for a typical viewing target, when viewed without a mask, then the energy detected when a mask is present is given by $$E = E_t \left(1 - \frac{\sum_{i=1}^{M} \delta x_i}{\Delta x}\right), \qquad (29)$$

since the energy blocked by the slits of the mask is proportional to the total width of the slits combined. Thus for a given minimum energy $E_{min}$, required to activate the detectors, the widths $\delta x_i$ are constrained to satisfy $$\sum_{i=1}^{M} \delta x_i \leq \left(1 - \frac{E_{min}}{E_t}\right) \Delta x. \qquad (30)$$

Condition (30), together with the condition that $\delta x_i \geq \delta x_{min}$, for $i=1, 2, \ldots, M$, determine the search range for widths $\delta x_1, \delta x_2, \ldots, \delta x_M$ over which a maximum of $\sigma(x_1, x_2, \ldots, x_M; \delta x_1, \delta x_2, \ldots, \delta x_M)$ is sought.

When values of $x_1, x_2, \ldots, x_M$ and $\delta x_1, \delta x_2, \ldots, \delta x_M$ are determined according to Equation 28, Equation 22 is used to generate an optimal mask.

In and alternative embodiment of the present invention, rather than maximize $\sigma(x_1, x_2, \ldots, x_M; \delta x_1, \delta x_2, \ldots, \delta x_M)$, the values of $x_1, x_2, \ldots, x_M$ and $\delta x_1, \delta x_2, \ldots, \delta x_M$ are determined by maximizing a weighted function $a(x_1, x_2, \ldots, x_M; \delta x_1, \delta x_2, \ldots, w(\delta x_1, \delta x_2, \ldots, \delta x_M))$, where w is an appropriate weight function. For example, w can put higher weight on smaller values of the widths $\delta x_i$, so that preference is given to masks having slits with smaller widths.

Figure 9B:
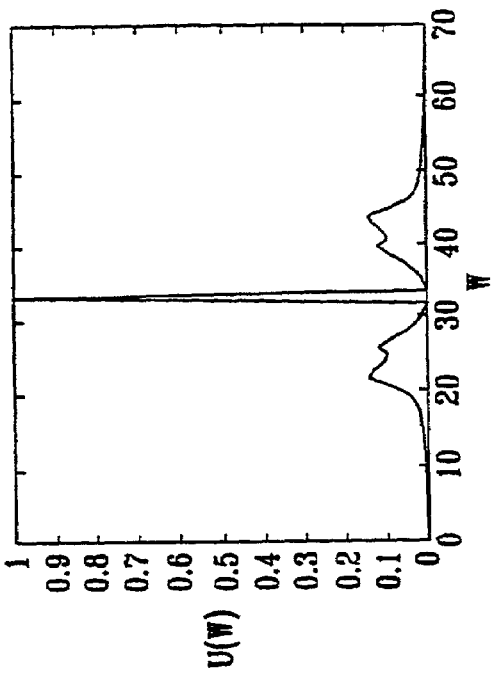
FIGS. 9A–9J illustrate the use of a mask in obtaining super-resolution, in accordance with a preferred embodiment of the present invention.
Figure 9D:
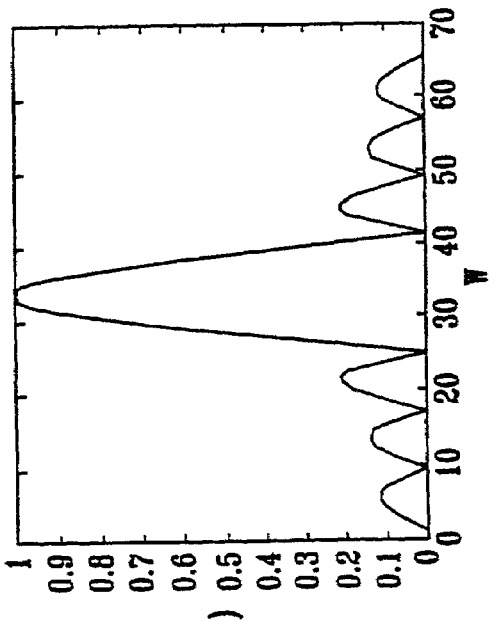
Figure 9A:
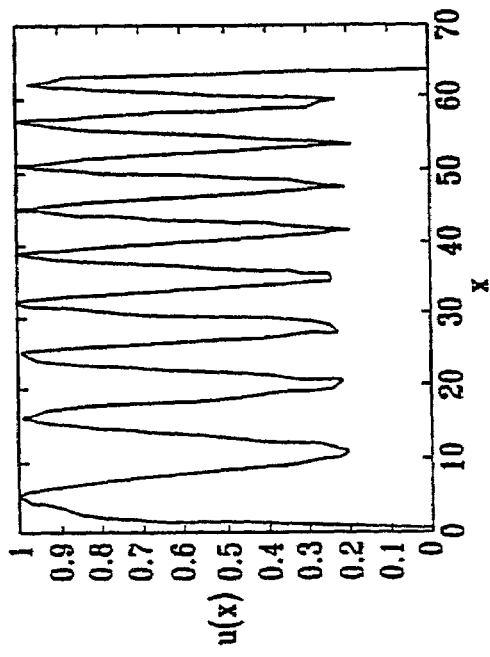
Figure 9C:
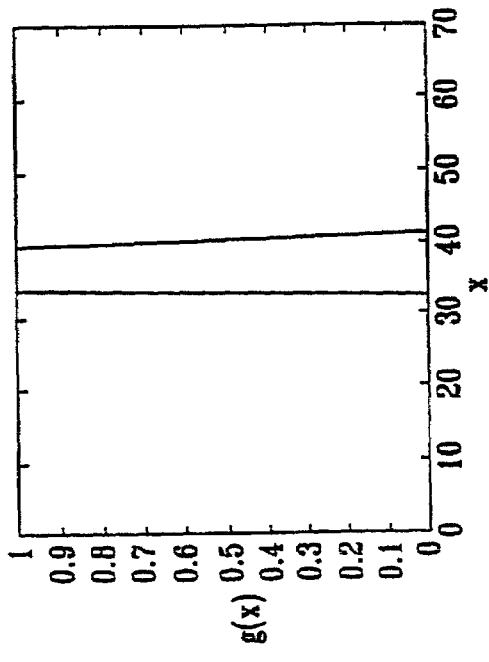

Reference is now made to FIGS. 9A–9J, which illustrate the use of a mask in obtaining super-resolution, in accordance with a preferred embodiment of the present invention. FIG. 9A illustrates an input object, such as a barcode, represented as a function u(x). FIG. 9B illustrates the Fourier transform of u(x). FIG. 9C illustrates a pixel sensitivity function g(x). FIG. 9D illustrates the Fourier transform of g(x).

Figure 9E:
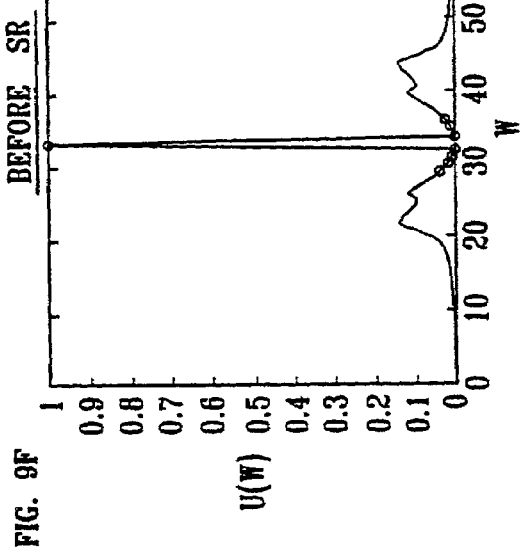
Figure 9F:
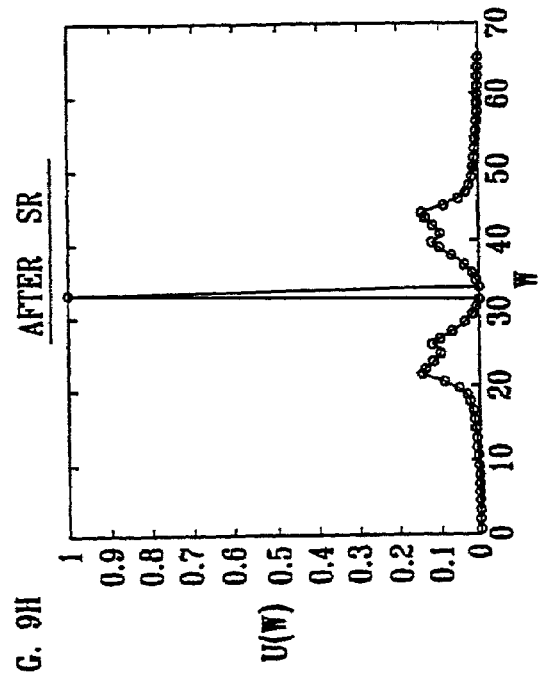
Figure 9G:
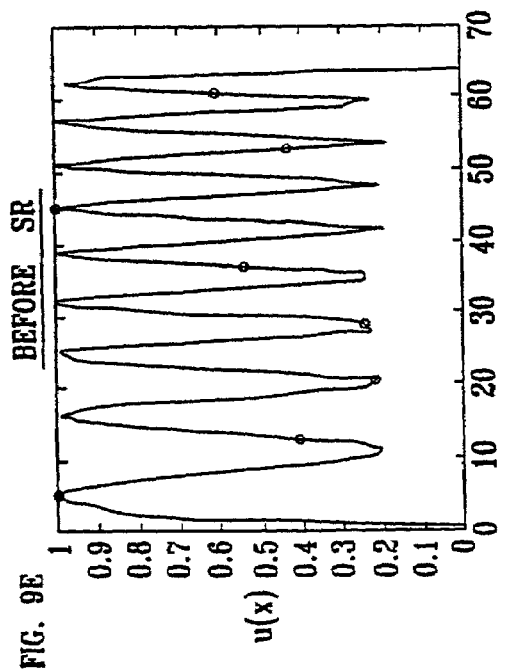
Figure 9H:
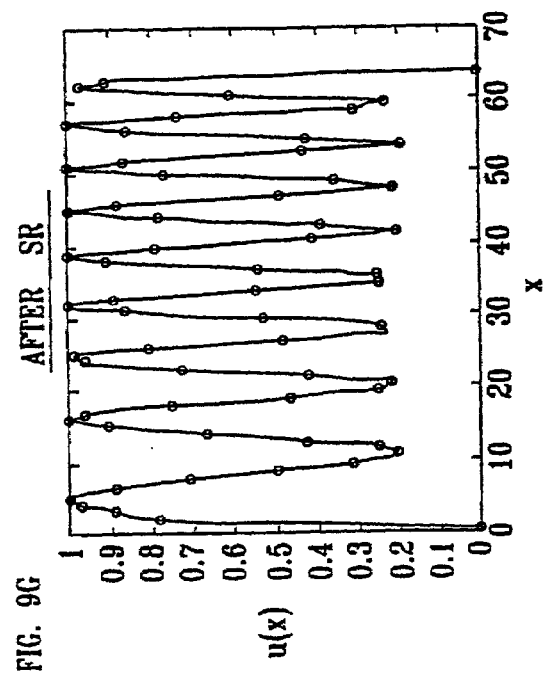
Figure 9I:
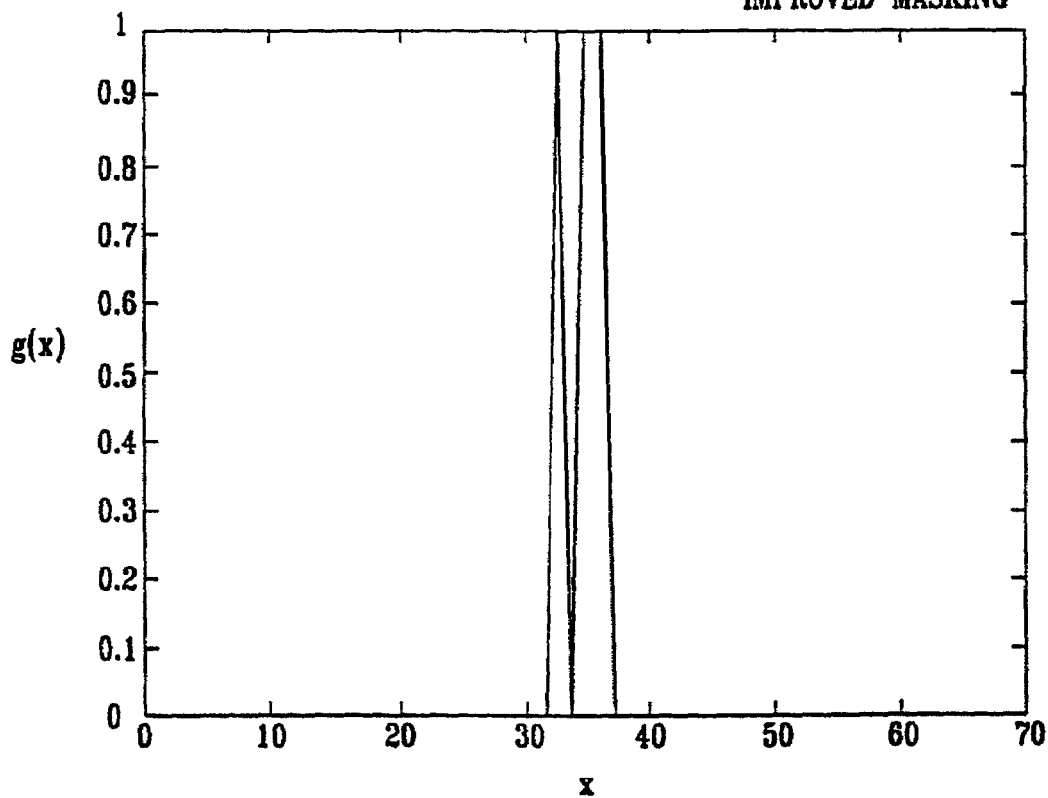

FIG. 9E illustrates conventional sampling of u(x) as a digital signal, without using super resolution enhancement. FIG. 9F illustrates the Fourier transform of the digital signal of FIG. 9E. FIG. 9G illustrates sampling of u(x) as a digital signal with a resolution eight times higher than the sampling illustrated in FIG. 9E. FIG. 9H illustrates the Fourier transform of the digital signal of FIG. 9G. FIG. 9I illustrates a mask used in accordance with a preferred embodiment of the present invention.

Figure 9J:
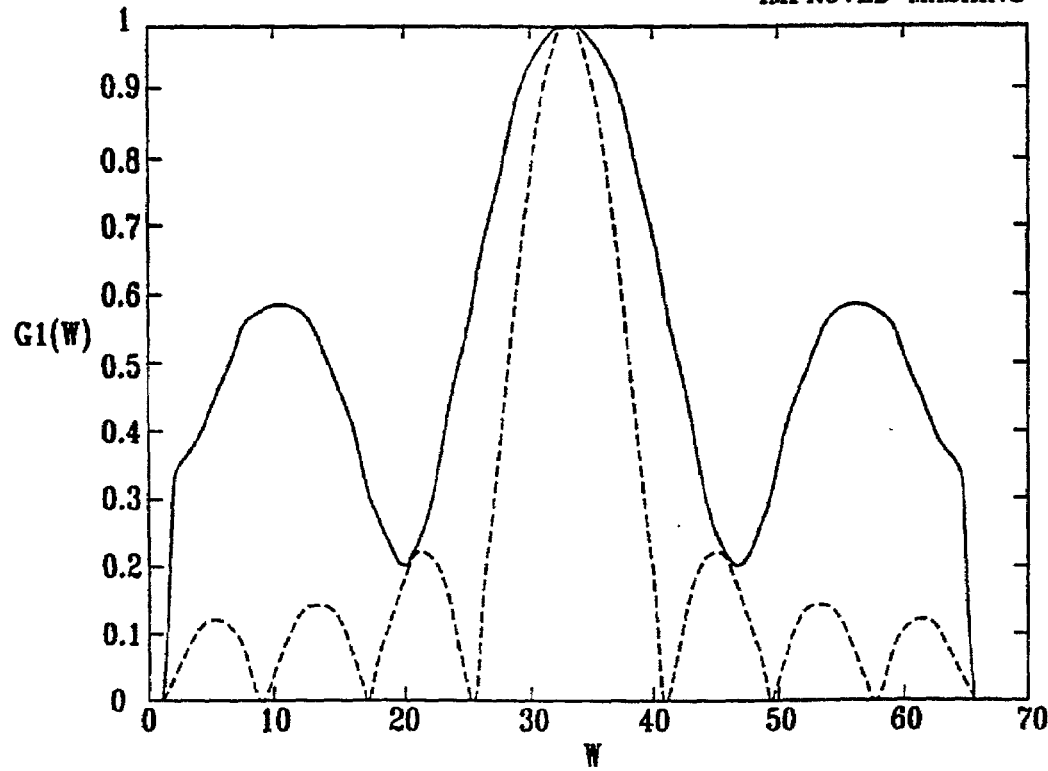

FIG. 9J illustrates the Fourier transform of a masked pixel, using the mask of FIG. 9I. By comparing FIG. 9D with FIG. 9J it can be seen that the spectrum of the masked pixel does not contain zeros within the region displayed. It can further be seen that an effect of the masking is to expand the spectrum of g(x).

Figure 10:
FIG. 10 illustrates an enhanced image obtained by applying super-resolution to the low resolution CCD captured image illustrated in FIG. 3B, without the use of a mask.

Reference is now made to FIG. 10, which illustrates an enhanced image obtained by applying super-resolution to the low resolution CCD captured image illustrated in FIG. 3B, without the use of a mask. As can be seen in FIG. 10, artifacts in the form of vertically oriented white stripes arise due to the presence of zeroes of $$G\left(-j\frac{\omega K}{\Delta x}\right).$$

When a mask is is/applied in accordance with a preferred embodiment of the present invention, the zeroes of $$G\left(-j\frac{\omega K}{\Delta x}\right)$$

are removed, and the result obtained is the image shown in FIG. 3C. It may thus be appreciated that the use of a mask serves to remove the artifacts indicated in FIG. 10.

Improved Approximation

As explained hereinabove, the approximation in Equation 18 is based on the assumption that $\omega$ is small enough to avoid aliasing in Equation 14. A more accurate approximation can be made by taking into consideration the aliasing between adjacent copies of S in the right-hand side of Equation 14. However, in order to obtain the increase in accuracy, it is necessary to increase the sampling rate.

It is appreciated by those skilled in the art that the assumption that aliasing between copies of S in Equation 14 is due to overlap between adjacent terms $$S\left(j\frac{\omega}{T}\right)$$

and $$S\left(j\frac{\omega \pm 2\pi}{T}\right)$$

is equivalent to the assumption that reduction of the sampling period from T to T/2 removes aliasing. Moreover, the information at frequency $\omega$ in the discrete Fourier transform of a signal sampled with sampling period T corresponds with the information at both frequencies $\omega/2$ and $\omega/2+\pi$ in the discrete Fourier transform of the signal sampled with sampling period T/2. A precise formulation of this relationship appears in the above referenced Oppenheim and Schafer as Equation 3.76, which describes a frequency-domain relationship between the input and the output of a sampling rate compressor ("downsampling").

These observations above are a basis for an improved approximation used in accordance with a preferred embodiment of the present invention, as described hereinbelow. Specifically, replace the sampling period, T, by T/2 in Equation 16:

$$y[n] = \int_{-\infty}^{\infty} s\left(t + n\frac{T}{2}\right) g(t) dt. \tag{31}$$

Under the assumption that aliasing in Equation 14 is due to overlap between adjacent terms $$S\left(j\frac{\omega}{T}\right)$$

and $$S\left(j\frac{\omega \pm 2\pi}{T}\right),$$

the approximation to $S(e_{j\omega})$ becomes $$S(e^{j\omega}) \approx \frac{1}{T} S\left(j\frac{\omega}{T}\right) + \frac{1}{T} S\left(j\frac{\omega - 2\pi}{T}\right), \ 0 < \omega < \pi, \tag{32}$$

for positive values of ω, and $$S(e^{j\omega}) \approx \frac{1}{T} S\left(j\frac{\omega}{T}\right) + \frac{1}{T} S\left(j\frac{\omega + 2\pi}{T}\right), \ -\pi < \omega < 0, \tag{33}$$

for negative values of ω.

Using similar analysis to that embodied in Equations 13–18, it can be shown that $$U(e^{j\omega}) \approx \frac{1}{2}\left[Y\left(e^{j\frac{\omega}{2}}\right) \Big/ G\left(-j\frac{\omega K}{\Delta x}\right) + Y\left(e^{j\frac{\omega-2\pi}{2}}\right) \Big/ G\left(-j\frac{(\omega-2\pi)K}{\Delta x}\right)\right], \tag{34}$$

$0 < \omega < \pi$, for positive values of ω, and $$U(e^{j\omega}) \approx \frac{1}{2}\left[Y\left(e^{j\frac{\omega}{2}}\right) \Big/ G\left(-j\frac{\omega K}{\Delta x}\right) + Y\left(e^{j\frac{\omega-2\pi}{2}}\right) \Big/ G\left(-j\frac{(\omega+2\pi)K}{\Delta x}\right)\right] \tag{35}$$

$-\pi < \omega < 0$, for negative values of ω. Equations 34 and 35 determine $U(e^{j\omega})$ more accurately than Equation 18, since they incorporate aliasing between adjacent copies of S in the sampling representation for $S(e^{j\omega})$. However, they require sub-pixel shifts of $$\frac{\Delta x}{2K}$$

between successively captured images. This corresponds to a factor of 2K increase in data acquisition, whereas the resolution is only enhanced by a factor of K.

An alternative approach to improving the approximation in Equation 18 by taking into consideration the aliasing between adjacent copies of S in the right-hand side of Equation 14, uses an alternating ("checkerboard") mask geometry. As mentioned hereinabove, the above discussion is based on use of a periodic mask, with a period of Δx. By using instead a mask with a period of 2Δx, one effectively generates two pixel sensitivity functions, $g_1(x)$ and $g_2(x)$, where $g_1(x)$ applies to even-numbered detectors and $g_2(x)$ applies to odd-numbered detectors. Specifically, $g_1(x)$ corresponds to g(x)m(x) and $g_2(x)$ corresponds to g(x)m(x+Δx), where g(x) is the pixel sensitivity function for the image sensing device and m(x) is the overall mask. Unlike the above case where the mask has a period of Δx, when the mask has a period of 2Δx there are effectively two masks operating (namely, the mask itself and the mask shifted by Δx), and consequently the even and odd-numbered pixels are processed differently.

Figure 11:
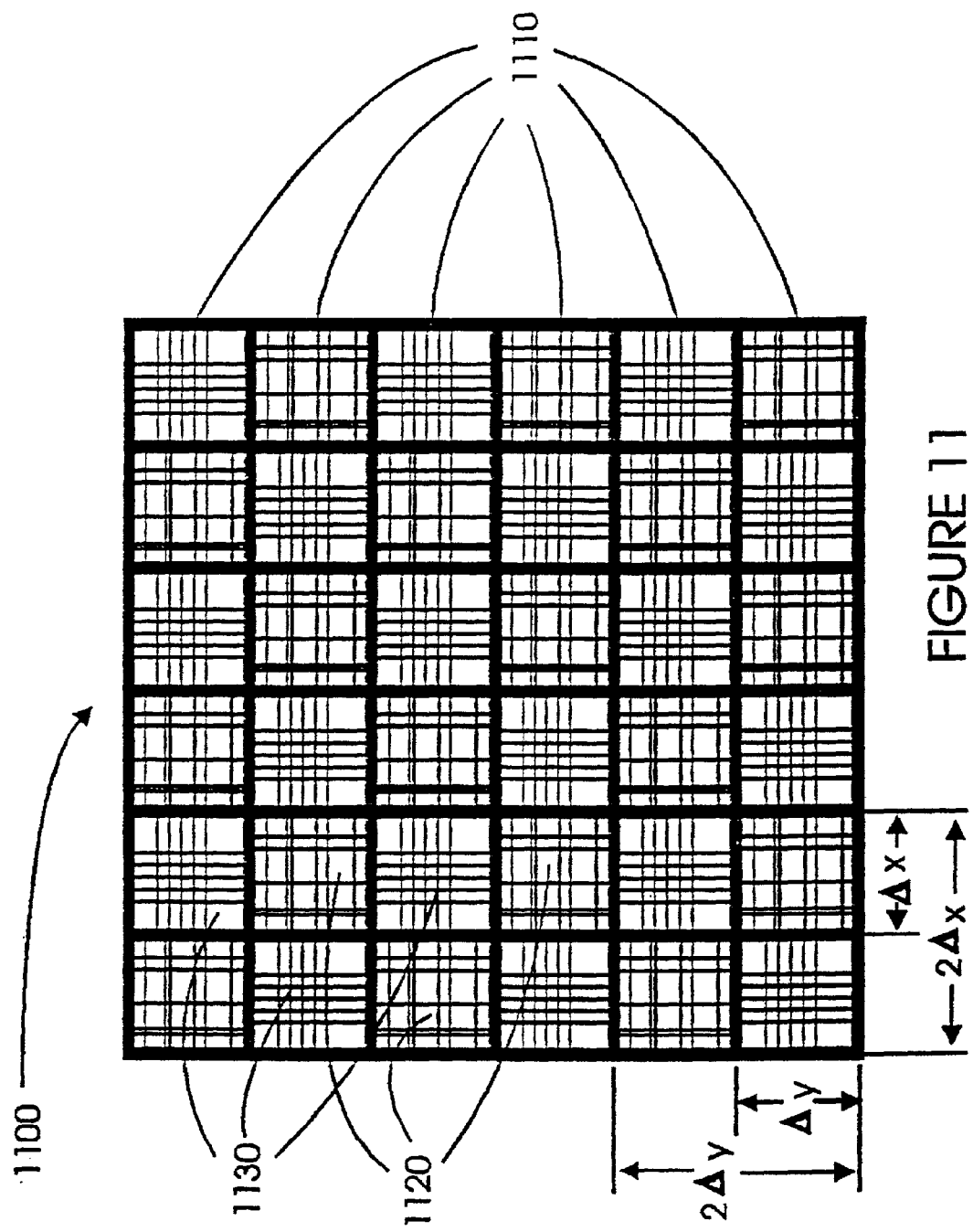
FIG. 11 is a simplified illustration of an alternating ("checkerboard") mask attached to a sensor panel of array detectors in an image sensing device, in accordance with a preferred embodiment of the present invention.

Reference is now made to FIG. 11, which is a simplified illustration of an alternating ("checkerboard") mask attached to a sensor panel of array detectors in an image sensing device, in accordance with a preferred embodiment of the present invention. A sensor panel 1100 in an image sensing device contains a two-dimensional array of detectors 1110. Detectors 1110 are depicted as individual cells within sensor panel 1100. The array of detectors is periodic, with periodic spacings Δx and Δy in the horizontal and vertical dimensions, respectively. The spacings Δx and Δy correspond to the pixel spacings in the sampled digital image obtained from the image sensing device.

In distinction to FIG. 7, FIG. 11 illustrates two different masking patterns 1120 and 1130 in the form of fine sub-pixel transmission gratings that are arranged in an alternating checkerboard pattern to generate a doubly periodic mask, with respective periods 2Δx and 2Δy in the horizontal and vertical dimensions. In a preferred embodiment of the present invention, the doubly periodic mask is attached to sensor panel 1100. The detectors 1110 are alternatively masked by the different masking patterns 1120 and 1130.

When using such a mask, Equation 2 (which is one-dimensional) separates into two equations, $$u_k[n] = \int_{-\infty}^{\infty} u\left(x + n\Delta x + k\frac{\Delta x}{K}\right) g_1(x) dx, \tag{36}$$

for even values of $n$; $k = 0, 1, \ldots, K-1$, and $$u_k[n] = \int_{-\infty}^{\infty} u\left(x + n\Delta x + k\frac{\Delta x}{K}\right) g_2(x) dx, \tag{37}$$

for odd values of $n$; $k = 0, 1, \ldots, K-1$.

By capturing twice as many images as previously, namely, 2K images, each detector moves over a full period of the mask, namely, 2Δx. Consequently, two sequences of the form of Equation 3 are acquired, namely, $$y_1[n] = \int_{-\infty}^{\infty} u\left(x + n\frac{\Delta x}{K}\right) g(x) dx, n = 0, 1, \ldots, KN-1, \text{ and} \quad (38)$$

$$y_2[n] = \int_{-\infty}^{\infty} u\left(x + n\frac{\Delta x}{K}\right) g(x) dx, n = 0, 1, \ldots, KN-1. \quad (39)$$

In turn, using the same analysis embodied in Equations 13–18, one arrives at the two conditions $$Y_1(e^{j\omega}) \approx \frac{1}{T} S\left(j\frac{\omega}{T}\right) G_1\left(-j\frac{\omega}{T}\right) + \frac{1}{T} S\left(j\frac{\omega - 2\pi}{T}\right) G_1\left(-j\frac{\omega - 2\pi}{T}\right), \quad (40)$$

$$Y_2(e^{j\omega}) \approx \frac{1}{T} S\left(j\frac{\omega}{T}\right) G_2\left(-j\frac{\omega}{T}\right) + \frac{1}{T} S\left(j\frac{\omega - 2\pi}{T}\right) G_2\left(-j\frac{\omega - 2\pi}{T}\right), \quad (41)$$

for positive values of $\Omega$, $0<\Omega<\pi$, and $$Y_1(e^{j\omega}) \approx \frac{1}{T} S\left(j\frac{\omega}{T}\right) G_1\left(-j\frac{\omega}{T}\right) + \frac{1}{T} S\left(j\frac{\omega - 2\pi}{T}\right) G_1\left(-j\frac{\omega - 2\pi}{T}\right), \quad (42)$$

$$Y_2(e^{j\omega}) \approx \frac{1}{T} S\left(j\frac{\omega}{T}\right) G_2\left(-j\frac{\omega}{T}\right) + \frac{1}{T} S\left(j\frac{\omega - 2\pi}{T}\right) G_2\left(-j\frac{\omega - 2\pi}{T}\right), \quad (43)$$

for negative values of $\Omega$, $-\pi<\Omega<0$. These equations can be used to solve for the individual copies $$S\left(j\frac{\omega}{T}\right)$$

and $$S\left(j\frac{\omega \pm 2\omega}{T}\right),$$

and then to recover $S(e^{j\omega})$ from Equations 32 and 33. The final result obtained, expressed in terms of $U(e^{j\omega})$, is $$U(e^{j\omega}) \approx \left[Y_2(e^{j\omega})\delta_{\frac{2\pi k}{\Delta x}} G_1\left(-j\frac{\omega K}{\Delta x}\right) - Y_1(e^{j\omega})\delta_{\frac{2\pi k}{\Delta x}} G_2\left(-j\frac{\omega K}{\Delta x}\right)\right] / \quad (44)$$
$$\left[G_2\left(-j\frac{\omega K}{\Delta x}\right)\delta_{\frac{2\pi k}{\Delta x}} G_1\left(-j\frac{\omega K}{\Delta x}\right) - G_1\left(-j\frac{\omega K}{\Delta x}\right)\delta_{\frac{2\pi k}{\Delta x}} G_2\left(-j\frac{\omega K}{\Delta x}\right)\right]$$

for positive values of $\omega$, $0<\omega<\pi$, and $$U(e^{j\omega}) \approx \left[Y_2(e^{j\omega})\delta_{\frac{2\pi k}{\Delta x}} G_1\left(-j\frac{\omega K}{\Delta x}\right) - Y_1(e^{j\omega})\delta_{\frac{2\pi k}{\Delta x}} G_2\left(-j\frac{\omega K}{\Delta x}\right)\right] / \quad (45)$$
$$\left[G_2\left(-j\frac{\omega K}{\Delta x}\right)\delta_{\frac{2\pi k}{\Delta x}} G_1\left(-j\frac{\omega K}{\Delta x}\right) - G_1\left(-j\frac{\omega K}{\Delta x}\right)\delta_{\frac{2\pi k}{\Delta x}} G_2\left(-j\frac{\omega K}{\Delta x}\right)\right]$$

for negative values of $\omega$, $-\pi<\omega$, $<0$. In Equations 44 and 45, the terms $\delta_\Psi G(-j\Omega)$ denote the difference $$\delta_\Psi G(-j\Omega) = G(-j\Omega) - G(-j(\Omega-\Psi)). \quad (46)$$

In distinction to the approach using Equations 34 and 35, whereby the improvement in accuracy stems from reducing the sub-pixel sampling shift in half, from $$\frac{\Delta x}{K} \text{ to } \frac{\Delta x}{2K},$$

the approach using Equations 42 and 43 obtains improvement in accuracy by acquiring 2K sampled images, each shifted by $$\frac{\Delta x}{K}.$$

Both approaches require collection of sampled data that is 2K as much data as in a single image captured by a sensing device. They differ in the types of masks used, and in the relative shifts between the multiple images acquired.

When implemented with full two-dimensional processing, both approaches described hereinabove require $4K^2$ as much data as in a single image captured by a sensing device, in order to enhance image resolution by a factor of two in each pixel dimension.

Geometric Super Resolution vs. Diffractive Super Resolution

The multiple image acquisition described above and illustrated in FIG. 6 is geometric in nature; i.e., it is based on viewing the same spatial information several times, such that in each view the object is shifted by a sub-pixel amount. It can be implemented by shifting positions of the sensing device ("temporal multiplexing") or, equivalently, by shifting fields of view ("spatial multiplexing") using an optical element that replicates views of the object with sub-pixel shifts between the replicas. The resolution of a system limited by geometry corresponds to the detection sampling system; i.e., the resolution of system sensors.

In distinction, multiple image acquisition can also be diffractive in nature. The resolution of a system limited by diffraction corresponds to the finest detail that can pass through the system without being distorted, and is proportional to the size of the aperture in the optical system. Thus the resolution of the human visual system is limited by the extent to which the eyes are open. When an observer squints his eyes, the resolution of a scene being viewed decreases, since the size of the opening is decreased.

For example, resolution enhancement can be implemented by an assembly of two moving rotated gratings, a first grating attached to the object being captured, and a second grating attached to a sensor of the sensing device, and moving in a direction opposite to that of the first grating. Such an assembly can be used to enhance the resolution of a diffractive system, since it effectively increases the size of the aperture in the optical system. The movement of the grating attached to the object encodes its spatial information by a Doppler-like effect, and allows the information to be transmitted through a restricted aperture of an imaging lens. The decoding of the information is obtained from the second grating attached to the sensing device, which moves in a direction opposite to that of the first grating. Such an assembly of two rotated gratings is practical for microscopic applications.

However, in many imaging systems the object is distant from the observer, and attachment of a grating to the object is impractical. When applied to scanning systems such as barcode readers, the present invention preferably simulates attachment of a moving grating to the object by illuminating the object with an illumination having a spatial structure of a grating. The illumination is shifted with time in order to simulate temporal motion of the grating. A specially designed diffractive optical element is attached to the illumination source so that a grating pattern appears in the object plane. The grating pattern is moved by phase modulating the light source, since linear phase modulations appear as shifts in a far field.

Additional Considerations

In reading the above description, persons skilled in the art will realize that there are many apparent variations that can be applied to the methods and systems described. For example, the integral in Equation 3 may be replaced by a discrete Gabor transform over u with window function g; namely, $$y[n] = \sum_p g\left(p\frac{\Delta x}{K}\right) u\left((m-p)\frac{\Delta x}{K}\right). \quad (47)$$

Similarly, one may use instead a wavelet or Mellin transform, as is well known to persons skilled in the art.

Additionally, the shifts between the multiple images that are acquired by the sensing device are not required to be equal. Furthermore, the shifts between the multiple images are not required to be horizontally or vertically disposed, nor are they required to be disposed in a fixed direction. Wavelet transforms and Mellin transforms are particularly advantageous when dealing with unequal shifts between acquired images.

Additionally, the reconstruction algorithm used in the present invention, for generating a high resolution image from multiple low resolution images, need not be separable. That is, it need not be comprised of horizontal and vertical reconstructions. Rather, the reconstruction algorithm used in the present invention can be a genuine two-dimensional algorithm.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for enhancing the resolution of an image sensing device, comprising the steps of:
    applying a periodically patterned mask to an image sensing device having a pixel sensitivity function, the device comprising a periodic array of detectors having at least one of a horizontal periodic spacing and a vertical periodic spacing,
    the periodically patterned mask having at least one of a horizontal period which is an integer multiple of said detectors' horizontal periodic spacing and a vertical period which is an integer multiple of the detectors' vertical periodic spacing,
    the mask modifying the pixel sensitivity function of the image sensing device, thereby to define a modified pixel sensitivity function of the device whose Fourier transform does not have zeros at frequencies that are between 0 and the maximal frequency at which no significant aliasing occurs;
    using the image sensing device with the mask to acquire multiple images of a scene from corresponding multiple fields of view related to one another by sub-pixel shifts, the multiple images defining sub-pixel samples; and
    combining the multiple images into an enhanced image of higher pixel resolution than the pixel resolutions of the multiple images, including:
        computing a Fourier transform of said samples;
        dividing said Fourier transform of said samples by a Fourier transform of said modified pixel sensitivity function, thereby to define a quotient; and
        computing an inverse Fourier transform of the quotient, thereby to define the enhanced image.

2. The method of claim 1 wherein the image sensing device is a scanner.

3. The method of claim 2 wherein the image sensing device is a barcode reader.

4. The method of claim 1 wherein the image sensing device is a CCD camera.

5. The method of claim 1 wherein the mask is a fine transmission grating.

6. The method of claim 1 wherein said combining step uses a Gabor transform.

7. The method of claim 1 wherein said combining step uses a wavelet transform.

8. The method of claim 1 wherein said combining step uses a Mellin transform.

9. A method according to claim 1, comprising the steps of:
    creating replicas of fields of view using an optical element attached to the image sensing device;
    acquiring multiple images with the sensing device from the replicas of fields of view; and
    combining the multiple images acquired from the replicas into an enhanced image of higher pixel resolution than the pixel resolutions of the multiple images acquired from the replicas.

10. The method of claim 9 wherein the optical element is a diffractive optical element.

11. The method of claim 9 wherein the optical element is a reflective optical element.

12. The method of claim 9 wherein the optical element is a combined diffractive and reflective optical element.

13. The method of claim 9 wherein the optical element produces an effect of a grating.

14. The method of claim 9 wherein the optical element is multi-faceted.

15. The method of claim 9 wherein the replicas of fields of views are non-overlapping.

16. A method according to claim 1 wherein said applying of a mask comprises bringing the mask into a substantially touching engagement with a detector plane defined by the periodic array of detectors.

17. A method for enhancing the resolution of an image sensing device, comprising the steps of:

attaching a mask to a panel of detectors in an image sensing device, the mask being a fine transmission grating, the panel of detectors comprising a periodic array of detectors, and the mask being periodic with period equal to that of the periodic array of detectors;
generating multiple fields of view, the multiple fields of view being related to one another by sub-pixel shifts;
acquiring multiple images with the image sensing device from the multiple fields of view; and
combining the multiple images into an enhanced image of higher pixel resolution than the pixel resolutions of the multiple images.

18. A method for enhancing the resolution of an image sensing device, comprising the steps of:
attaching a mask to a panel of detectors in an image sensing device, the mask being a fine transmission grating, the panel of detectors comprising a periodic array of detectors, and the mask being periodic with period twice that of the periodic array of detectors;
generating multiple fields of view, the multiple fields of view being related to one another by sub-pixel shifts;
acquiring multiple images with the image sensing device from the multiple fields of view; and
combining the multiple images into an enhanced image of higher pixel resolution than the pixel resolutions of the multiple images.

19. A method for enhancing the resolution of an image sensing device, comprising the steps of:
attaching a periodic to a panel of detectors in an image sensing device, the mask being a fine transmission grating;
generating multiple fields of view, the multiple fields of view being related to one another by sub-pixel shifts;
acquiring multiple images with the image sensing device from the multiple fields of view;
combining the multiple images into an enhanced image of higher pixel resolution than the pixel resolutions of the multiple images, and
determining the number of slits, the positions of the slits and the widths of the slits in the fine transmission grating.

20. The method of claim 19 wherein said determining step determines the number of slits, the positions of the slits and the widths of the slits, so that the mask eliminates zeroes in a Fourier transform of a function representing a sensitivity of a pixel, within a prescribed range of frequencies.

21. The method of claim 20 wherein the widths of the slits are constrained so as not to block more than a prescribed fraction of light energy from reaching the detectors.

22. The method of claim 20 wherein the widths of the slits are constrained so as not to be smaller than a prescribed minimum width.

23. The method of claim 20 wherein said determining step uses a weight function specifying relative weights to be placed on values for the widths of the slits.

24. The method of claim 20 wherein the mask is of the form $$m(x) = 1 - \sum_{i=1}^{M} rect\left(\frac{x}{\delta x_i}\right) \otimes \delta(x - x_i).$$

25. A method for enhancing the resolution of an image sensing device, comprising the steps of:

attaching a periodic to a panel of detectors in an image sensing device;
generating multiple fields of view, the multiple fields of view being related to one another by sub-pixel shifts;
acquiring multiple images with the image sensing device from the multiple fields of view; and
combining the multiple images into an enhanced image of higher pixel resolution than the pixel resolutions of the multiple images,
wherein said generating step uses natural vibrations of a platform supporting the sensing device.

26. A method for enhancing the resolution of an image sensing device, comprising the steps of:
attaching a periodic to a panel of detectors in an image sensing device;
generating multiple fields of view, the multiple fields of view being related to one another by sub-pixel shifts;
acquiring multiple images with the image sensing device from the multiple fields of view; and
combining the multiple images into an enhanced image of higher pixel resolution than the pixel resolutions of the multiple images,
wherein said generating step uses at least one mirror to shift fields of view of the image sensing device by sub-pixel shifts.

27. A method for enhancing the resolution of an image sensing device, comprising the steps of:
attaching a periodic to a panel of detectors in an image sensing device:
generating multiple fields of view, the multiple fields of view being related to one another by sub-pixel shifts;
acquiring multiple images with the image sensing device from the multiple fields of view; and
combining the multiple images into an enhanced image of higher pixel resolution than the pixel resolutions of the multiple images,
wherein said combining step is applied separately to rows and columns of pixel data.

28. The method of claim 27 wherein said combining step uses the approximation $$U(e^{j\omega}) \approx \frac{Y(e^{j\omega})}{G\left(-j\frac{\omega K}{\Delta x}\right)},$$

to determine the rows and columns of pixel data of the enhanced image.

29. The method of claim 28 wherein said combining step comprises applying an inverse Fourier transform to values of $U(e^{j\omega})$.

30. The method of claim 27 wherein said combining step uses the approximation $$U(e^{j\omega}) \approx \frac{1}{2}\left[Y\left(e^{j\frac{\omega}{2}}\right) \Big/ G\left(-j\frac{\omega K}{\Delta x}\right) + Y\left(e^{j\frac{\omega-2\pi}{2}}\right) \Big/ G\left(-j\frac{(\omega-2\pi)K}{\Delta x}\right)\right],$$

$$0 < \omega < \pi,$$

for positive values of $\omega$, and $$U(e^{j\omega}) \approx$$

-continued $$\frac{1}{2}\left[Y\left(e^{j\frac{\omega}{2}}\right)\bigg/G\left(-j\frac{\omega K}{\Delta x}\right)+Y\left(e^{j\frac{\omega-2\pi}{2}}\right)\bigg/G\left(-j\frac{(\omega-2\pi)K}{\Delta x}\right)\right], -\pi<\omega<0,$$

for negative values of ω, to determine the rows and columns of pixel data of the enhanced image.

31. The method of claim 30 wherein said combining step comprises applying an inverse Fourier transform to values of $U(e^{j\omega})$.

32. The method of claim 27 wherein said combining step uses the approximation $$U(e^{j\omega})\approx\left[Y_2(e^{j\omega})\delta_{\frac{2\pi k}{\Delta x}}G_1\left(-j\frac{\omega K}{\Delta x}\right)-Y_1(e^{j\omega})\delta_{\frac{2\pi k}{\Delta x}}G_2\left(-j\frac{\omega K}{\Delta x}\right)\right]\bigg/$$
$$\left[G_2\left(-j\frac{\omega K}{\Delta x}\right)\delta_{\frac{2\pi k}{\Delta x}}G_1\left(-j\frac{\omega K}{\Delta x}\right)-G_1\left(-j\frac{\omega K}{\Delta x}\right)\delta_{\frac{2\pi k}{\Delta x}}G_2\left(-j\frac{\omega K}{\Delta x}\right)\right]$$

for positive values of ω, 0<ω<π, and $$U(e^{j\omega})\approx\left[Y_2(e^{j\omega})\delta_{\frac{2\pi K}{\Delta x}}G_1\left(-j\frac{\omega K}{\Delta x}\right)-Y_1(e^{j\omega})\delta_{-\frac{2\pi K}{\Delta x}}G_2\left(-j\frac{\omega K}{\Delta x}\right)\right]\bigg/\left[G_2\left(-j\frac{\omega K}{\Delta x}\right)\delta_{-\frac{2\pi K}{\Delta x}}G_1\left(-j\frac{\omega K}{\Delta x}\right)\delta_{-\frac{2\pi K}{\Delta x}}G_2\left(-j\frac{\omega K}{\Delta x}\right)\right]$$

for negative values of ω, −π<Ω<0, and wherein the terms $\delta_\Psi G(-j\Omega)$ denote the difference $$\delta_\Psi G(-j\Omega)=G(-j\Omega)-G(-j(\Omega-\Psi)),$$

to determine the rows and columns of pixel data of the enhanced image.

33. The method of claim 32 wherein said combining step comprises applying an inverse Fourier transform to values of $U(e^{j\omega})$.

34. A system for enhancing the resolution of an image sensing device, comprising:
an image sensing device comprising a periodic array of detectors having at least one of a horizontal periodic spacing and a vertical periodic spacing, said image sensing device having a pixel sensitivity function;
a periodically patterned mask attached to said image sensing device, said mask having at least one of a horizontal period which is an integer multiple of said detectors' horizontal periodic spacing and a vertical period which is an integer multiple of the detectors' vertical periodic spacing, said mask being operative to modify said pixel sensitivity function of said image sensing device, thereby to define a modified pixel sensitivity function of said device whose Fourier transform does not have zeros at frequencies that are between 0 and the maximal frequency at which no significant aliasing occurs;
image acquisition circuitry, operative to acquire multiple images of a scene from corresponding multiple fields of view related to one another by sub-pixel shifts, said multiple images defining sub-pixel samples; and
a combiner combining the multiple images into an enhanced image of higher pixel resolution than the pixel resolutions of the multiple images, said combiner being operative
to compute a Fourier transform of said samples;
to divide said Fourier transform of said samples by a Fourier transform of said modified pixel sensitivity function, thereby to define a quotient; and
to compute an inverse Fourier transform of the quotient, thereby to define the enhanced image.

35. The system of claim 34 wherein said image sensing device is a scanner.

36. The system of claim 35 wherein said image sensing device is a barcode reader.

37. The system of claim 34 wherein said image sensing device is a CCD camera.

38. The system of claim 32 wherein said mask is a fine transmission grating.

39. The system of claim 34 wherein said combiner uses a Gabor transform.

40. The system of claim 34 wherein said combiner uses a wavelet transform.

41. The system of claim 32 wherein said combiner uses a Mellin transform.

42. A system according to claim 34 wherein said multiple images are acquired by creating replicas of fields of view using an optical element attached to the image sensing device.

43. The system of claim 42 wherein said optical element is a diffractive optical element.

44. The system of claim 42 wherein said optical element is a reflective optical element.

45. The system of claim 42 wherein said optical element is a combined diffractive and reflective optical element.

46. The system of claim 42 wherein said optical element produces an effect of a grating.

47. The system of claim 42 wherein said optical element is multi-faceted.

48. The system of claim 42 wherein the replicas of fields of view are non-overlapping.

49. A system for enhancing the resolution of an image sensing device, comprising:
an image sensing device comprising a panel of detectors said panel of detectors comprising a periodic array of detectors;
a mask attached to said panel of detectors said mask being a fine transmission grating, and said mask being periodic with period equal to that of said periodic array of detectors;
a motion generator generating multiple fields of view the multiple fields of view being related to one another by sub-pixel shifts;
image acquisition circuitry housed within said image sensing device acquiring multiple images from the multiple fields of view; and
a combiner combining the multiple images into an enhanced image of higher pixel resolution than the pixel resolutions of the multiple images.

50. A system for enhancing the resolution of an image sensing device, comprising:
an image sensing device comprising a panel of detectors, said panel of detectors comprising a periodic array of detectors;

a mask attached to said panel of detectors, said mask being a fine transmission grating, and said mask being periodic with period twice that of said periodic array of detectors;

a motion generator generating multiple fields of view, the multiple fields of view being related to one another by sub-pixel shifts;

image acquisition circuitry housed within said image sensing device acquiring multiple images from the multiple fields of view; and a combiner combining the multiple images into an enhanced image of higher pixel resolution than the pixel resolutions of the multiple images.

51. A system for enhancing the resolution of an image sensing device, comprising:

an image sensing device comprising a panel of detectors;

a periodic attached to said panel of detectors, said mask being a fine transmission grating;

a motion generator generating multiple fields of view, the multiple fields of view being related to one another by sub-pixel shifts;

image acquisition circuitry housed within said image sensing device acquiring multiple images from the multiple fields of view;

a combiner combining the multiple images into an enhanced image of higher pixel resolution than the pixel resolutions of the multiple images; and a grating generator determining the number of slits, the positions of the slits and the widths of the slits in the fine transmission grating.

52. The system of claim 51 wherein said grating generator determines the number of slits, the positions of the slits and the widths of the slits, so that said mask eliminates zeroes in a Fourier transform of a function representing a sensitivity of a pixel.

53. The system of claim 52 wherein the widths of the slits are constrained so as not to block more than a prescribed fraction of light energy from reaching the detectors.

54. The system of claim 52 wherein the widths of the slits are constrained so as not to be smaller than a prescribed minimum width.

55. The system of claim 52 wherein said grating generator uses a weight function specifying relative weights to be placed on values for the widths of the slits.

56. The system of claim 52 wherein said mask is of the form $$m(x) = 1 - \sum_{i=1}^{M} rect\left(\frac{x}{\delta x_i}\right) \otimes \delta(x - x_i).$$

57. A system for enhancing the resolution of an image sensing device, comprising:

an image sensing device comprising a panel of detectors;

a periodic attached to said panel of detectors;

a motion generator generating multiple fields of view, the multiple fields of view being related to one another by sub-pixel shifts, said motion generator using natural vibrations of a platform supporting the sensing device;

image acquisition circuitry housed within said image sensing device acquiring multiple images from the multiple fields of view; and a combiner combining the multiple images into an enhanced image of higher pixel resolution than the pixel resolutions of the multiple images.

58. A system for enhancing the resolution of an image sensing device, comprising:

an image sensing device comprising a panel of detectors;

a periodic attached to said panel of detectors;

a motion generator generating multiple fields of view, the multiple fields of view being related to one another by sub-pixel shifts, said motion generator using at least one mirror to shift fields of view of the image sensing device by sub-pixel shifts;

image acquisition circuitry housed within said image sensing device acquiring multiple images from the multiple fields of view; and a combiner combining the multiple images into an enhanced image of higher pixel resolution than the pixel resolutions of the multiple images.

59. A system for enhancing the resolution of an image sensing device, comprising:

an image sensing device comprising a panel of detectors:

a periodic attached to said panel of detectors:

a motion generator generating multiple fields of view, the multiple fields of view being related to one another by sub-pixel shifts;

image acquisition circuitry housed within said image sensing device acquiring multiple images from the multiple fields of view; and a combiner combining the multiple images into an enhanced image of higher pixel resolution than the pixel resolutions of the multiple images, said combiner being applied separately to rows and columns of pixel data.

60. The system of claim 59 wherein said combiner uses the approximation $$U(e^{j\omega}) \approx \frac{Y(e^{j\omega})}{G\left(-j\frac{\omega K}{\Delta x}\right)},$$

to determine the rows and columns of pixel data of the enhanced image.

61. The system of claim 60 wherein said combiner applies an inverse Fourier transform to values of $U(e_{j\omega})$.

62. The system of claim 59 wherein said combiner uses the approximation $$U(e^{j\omega}) \approx \frac{1}{2}\left[Y\left(e^{j\frac{\omega}{2}}\right)/G\left(-j\frac{\omega K}{\Delta x}\right) + Y\left(e^{j\frac{\omega-2\pi}{2}}\right)/G\left(-j\frac{(\omega-2\pi)K}{\Delta x}\right)\right],$$

$$0 < \omega < \pi,$$

for positive values of $\omega$, and $$U(e^{j\omega}) \approx$$

$$\frac{1}{2}\left[Y\left(e^{j\frac{\omega}{2}}\right)/G\left(-j\frac{\omega K}{\Delta x}\right) + Y\left(e^{j\frac{\omega+2\pi}{2}}\right)/G\left(-j\frac{(\omega+2\pi)K}{\Delta x}\right)\right] - \pi < \omega < 0,$$

for negative values of $\omega$, to determine the rows and columns of pixel data of the enhanced image.

63. The system of claim 62 wherein said combiner comprises applying an inverse Fourier transform to values of $U(e^{j\omega})$.

64. The system of claim 59 wherein said combiner uses the approximation $$U(e^{j\omega}) \approx \left[Y_2(e^{j\omega})\delta_{\frac{2\pi K}{\Delta x}}G_1\left(-j\frac{\omega K}{\Delta x}\right) - Y_1(e^{j\omega})\delta_{-\frac{2\pi k}{\Delta x}}G_2\left(-j\frac{\omega K}{\Delta x}\right)\right] / \left[G_2\left(-j\frac{\omega K}{\Delta x}\right)\delta_{-\frac{2\pi K}{\Delta x}}G_1\left(-j\frac{\omega K}{\Delta x}\right) - G_1\left(-j\frac{\omega K}{\Delta x}\right)\delta_{\frac{2\pi K}{\Delta x}}G_2\left(-j\frac{\omega K}{\Delta x}\right)\right]$$

for positive values of ω, 0<ω<π, and $$U(e^{j\omega}) \approx \left[Y_2(e^{j\omega})\delta_{-\frac{2\pi K}{\Delta x}}G_1\left(-j\frac{\omega K}{\Delta x}\right) - Y_1(e^{j\omega})\delta_{-\frac{2\pi k}{\Delta x}}G_2\left(-j\frac{\omega K}{\Delta x}\right)\right] / \left[G_2\left(-j\frac{\omega K}{\Delta x}\right)\delta_{-\frac{2\pi K}{\Delta x}}G_1\left(-j\frac{\omega K}{\Delta x}\right) - G_1\left(-j\frac{\omega K}{\Delta x}\right)\delta_{-\frac{2\pi K}{\Delta x}}G_2\left(-j\frac{\omega K}{\Delta x}\right)\right]$$

for negative values of ω, −π<ω<0, and wherein the terms $\delta_\Psi(-j\Omega)$ denote the difference $$\delta_\Psi G(-j\Omega) = G(-j\Omega) - G(-j(\Omega-\Psi)),$$

to determine the rows and columns of pixel data of the enhanced image.

65. The system of claim 64 wherein said combiner comprises applying an inverse Fourier transform to values of $U(e^{j\omega})$.

* * * * *